(12) United States Patent
Numata

(10) Patent No.: US 8,671,173 B2
(45) Date of Patent: Mar. 11, 2014

(54) INFORMATION PROCESSING DEVICE, COUNTING METHOD, AND COMPUTER PROGRAM

(75) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/462,534

(22) Filed: Aug. 4, 2006

(65) Prior Publication Data

US 2007/0035767 A1 Feb. 15, 2007

(30) Foreign Application Priority Data

Aug. 9, 2005 (JP) .................................. 2005-230841

(51) Int. Cl.
*G06F 15/173* (2006.01)
(52) U.S. Cl.
USPC .......... 709/223; 709/206; 709/225; 328/1.14; 715/752; 358/402
(58) Field of Classification Search
USPC ........................................................ 709/223
See application file for complete search history.

(56) References Cited

U.S. PATENT DOCUMENTS

| 6,189,032 B1* | 2/2001 | Susaki et al. .................. 709/225 |
| 6,193,154 B1* | 2/2001 | Phillips et al. ................ 235/381 |
| 6,944,777 B1* | 9/2005 | Belani et al. .................. 713/150 |
| 8,135,632 B2* | 3/2012 | Tanida ............................ 705/30 |
| 2001/0034747 A1* | 10/2001 | Fujitani et al. ................ 707/525 |
| 2002/0048036 A1* | 4/2002 | Nakagawa et al. .......... 358/1.14 |
| 2003/0030835 A1* | 2/2003 | Yoshida et al. .............. 358/1.14 |
| 2003/0120954 A1* | 6/2003 | Sugiyama ..................... 713/201 |
| 2003/0197885 A1* | 10/2003 | Takeo ........................... 358/1.14 |
| 2005/0007619 A1* | 1/2005 | Minato ......................... 358/1.14 |
| 2005/0275868 A1* | 12/2005 | Higashiura et al. .......... 358/1.14 |
| 2006/0077431 A1* | 4/2006 | Zhang et al. ................. 358/1.15 |
| 2006/0132823 A1* | 6/2006 | Sakamoto .................... 358/1.14 |

FOREIGN PATENT DOCUMENTS

JP 2005-091600 A 4/2005

OTHER PUBLICATIONS

Jun. 30, 2009 Japanese Office Action that issued in Japanese Patent Application No. 2005-230841.

\* cited by examiner

*Primary Examiner* — Phuoc Nguyen
*Assistant Examiner* — June Sison
(74) *Attorney, Agent, or Firm* — Cowan, Liebowitz & Latman, P.C.

(57) ABSTRACT

There is provided an information processing device which counts a use amount at a time when a user uses a data processing device, as the use amount corresponding to the relevant user. The information processing device comprises: an input unit for inputting discrimination information of a first user; an acquisition unit for, after the discrimination information is input by the input unit, acquiring permission to count the use amount at a time when a second user uses the data processing device, as the use amount corresponding to the first user, from said first user; and a counting unit for, in a case where the permission is acquired by the acquisition unit, counting the use amount at the time when the second user uses the data processing device, as the use amount corresponding to the first user.

10 Claims, 28 Drawing Sheets

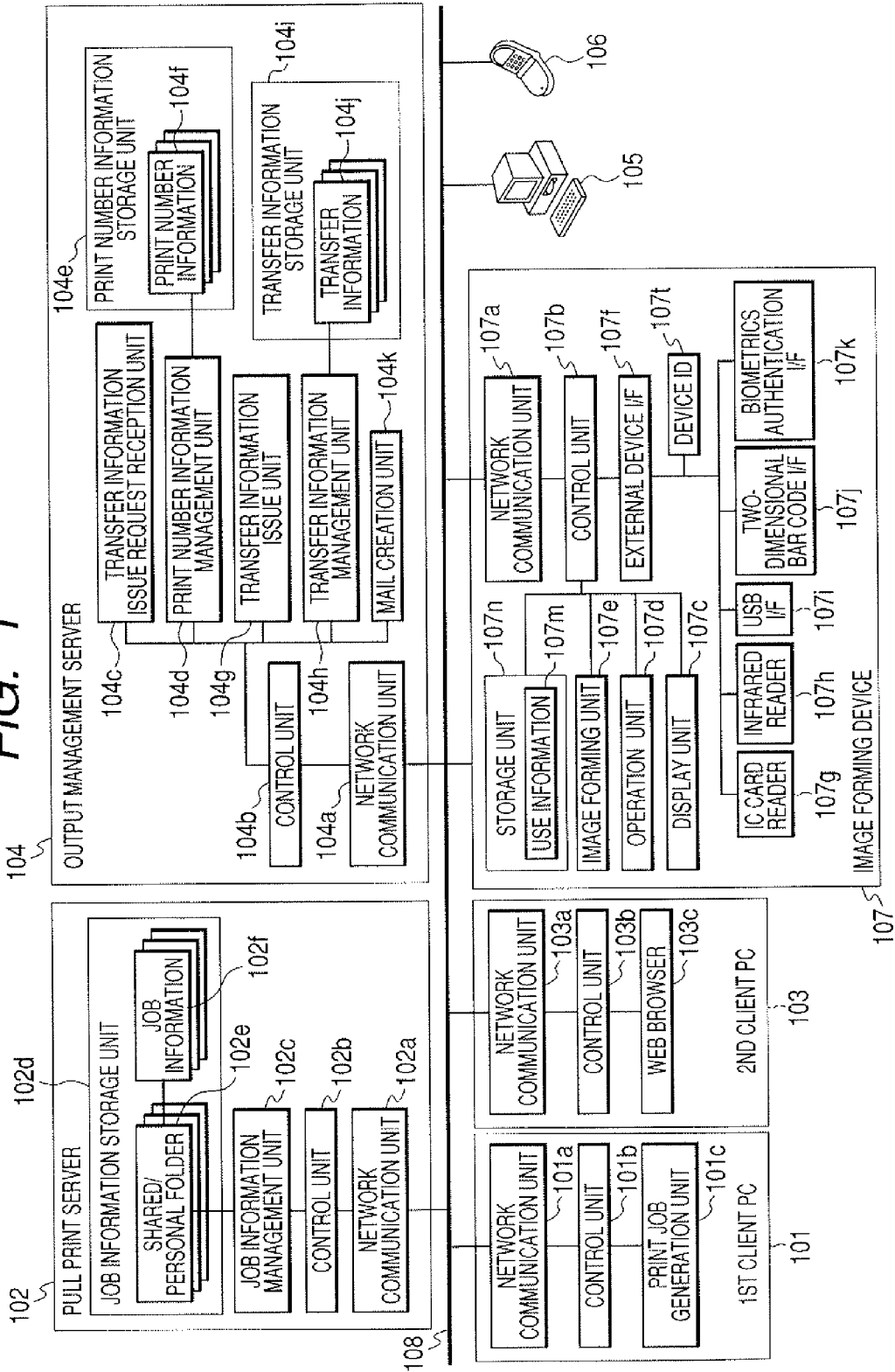

FIG. 2

PRINTER DRIVER                                                              [?] [X]

LOGGED-IN USER: user C

JOB NAME: [FIRST-TERM REPORT.doc]

REGISTRATION DESTINATION
FOLDER NAME: [STUDENT'S SHARED FOLDER ▼]
[PERSONAL FOLDER FOR user C]

PRINT RANGE
● WHOLE
○ CURRENT PAGE
○ DESIGNATED PAGES [          ]
DESIGNATE PAGE NUMBERS SUCH AS
"1, 3, 6" BY USING COMMAS, OR
DESIGNATE PAGE RANGE SUCH AS "4-8"

PRINT FORMAT
COLOR SETTING: ○ BLACK-AND-WHITE   ● COLOR
DOUBLE-SIDED SETTING: ● DOUBLE-SIDED   ○ SINGLE-SIDED
PAPER SIZE: [A4 ▼]
LAYOUT: [2 PAGES/SHEET ▼]

[REGISTER]   [CANCEL]

*FIG. 4*

| |
|---|
| JOB NAME (E.G., FIRST-TERM REPORT.doc) |
| JOB ID (E.G., 1234) |
| PRINT DATA (E.G., PDL DATA) |
| JOB INFORMATION (E.G., 20 PAGES, COLOR) |
| REGISTER ID (E.G., user C) |
| REGISTRATION DATE AND TIME (E.G., 20xx/10/14 15:12) |
| PRINT FORMAT AT REGISTRATION (E.G., COLOR, DOUBLE-SIDED, 2 PAGES/SHEET) |

FIG. 5

| | |
|---|---|
| DISCRIMINATION INFORMATION (E.G., USER ID: user A) | 501 |
| PASSWORD (EX., xxxxxx) | 502 |
| MAIL ADDRESS (EX., userA@△△△.com) | 503 |
| UPPER LIMIT PRINT NUMBER | BLACK-AND-WHITE (E.G., 100 SHEETS/MONTH) — 504 |
| | COLOR (E.G., 50 SHEETS/MONTH) — 505 |
| ACCUMULATED NUMBER | BLACK-AND-WHITE (E.G., 60 SHEETS/MONTH) — 506 |
| | COLOR (E.G., 20 SHEETS/MONTH) — 507 |
| REMAINING NUMBER | BLACK-AND-WHITE (E.G., 40 SHEETS/MONTH) — 508 |
| | COLOR (E.G., 30 SHEETS/MONTH) — 509 |
| PRINT FORMAT SETTING AUTHORITY | COLOR SETTING (E.G., COLORABLE) — 510 |
| | DOUBLE-SIDED SETTING (E.G., ONLY DOUBLE-SIDED) — 511 |
| | LAYOUT SETTING (E.G., ONLY 2 PAGES/SHEET) — 512 |

FIG. 7

FILE   EDIT   DISPLAY   FAVORITE   MEDIA

ADDRESS   http://www.printmanager.com/change

LOGOUT

REQUEST OF ISSUE OF TRANSFER INFORMATION

USER NAME: user A

| ACCUMULATED NUMBER/ UPPER LIMIT NUMBER | · BLACK-AND-WHITE: 67/100 SHEETS<br>· COLOR: 32/50 SHEETS |

TRANSFER DESTINATION USER    user B

TRANSFER NUMBER OF SHEETS   BLACK-AND-WHITE  [ 0 ] SHEETS
                            COLOR            [ 15 ] SHEETS

VALID NUMBER OF TIMES  [ 1 ] TIMES
VALIDITY TERM   [ 20xx ] YEAR [ 10 ] MONTH [ 15 ] DAY [ 24:00 ]

INPUT JOB ID WHEN DESIGNATING JOB  [ 1234 ]
PRINT FORMAT DESIGNATION  ⦿ YES    ○ NO
704    COLOR SETTING:         ⦿ COLOR       ○ BLACK-AND-WHITE
       DOUBLE-SIDED SETTING: ⦿ DOUBLE-SIDED ○ SINGLE-SIDED
       PAPER SIZE: SETTING   [ A4 ▼ ]
       LAYOUT:               [ 2 PAGES/SHEET ▼ ]

CLICK PRINT FORMAT SETTING AUTHORITY TRANSFER SETTING BUTTON WHEN
TRANSFERRING ALSO PRINT FORMAT SETTING AUTHORITY

MAIL NOTIFICATION TO TRANSFER DESTINATION    [ PRINT FORMAT SETTING
USER                                           AUTHORITY TRANSFER SETTING ]
      ⦿ YES      ○ NO
703  COMMENT                                                701

[ I RECEIVE IT IN FRONT OF SCHOOL GATE AT 12:00 ]

[ OK ]       [ CANCEL ]

```
                                                    _ □ ×
FILE   EDIT   DISPLAY   FAVORITE   MEDIA
  ADDRESS   http://www.printmanager.com/printsetting        ▽

LOGOUT

PRINT FORMAT SETTING AUTHORITY TRANSFER SCREEN

USER NAME: user A

┌─────────────┬──────────────────────────────────────────────────────┐
│             │ COLOR SETTING AUTHORITY: BLACK-AND-WHITE  COLOR      │
│PRINT FORMAT │ DOUBLE-SIDED SETTING AUTHORITY: DOUBLE-SIDED  SINGLE-SIDED │
│  SETTING    │ PAPER SIZE SETTING AUTHORITY: A4                     │
│ AUTHORITY   │ LAYOUT SETTING AUTHORITY: 1 PAGE/SHEET 2 PAGES/SHEET 4 PAGES/SHEET │
└─────────────┴──────────────────────────────────────────────────────┘

TRANSFER AUTHORITY DESIGNATION

COLOR SETTING AUTHORITY:    ● TRANSFER ○ NOT TRANSFER
    DOUBLE-SIDED SETTING AUTHORITY:    ○ TRANSFER ● NOT TRANSFER
       PAPER SIZE SETTING AUTHORITY:   ○ TRANSFER ● NOT TRANSFER
          LAYOUT SETTING AUTHORITY:    ○ TRANSFER ● NOT TRANSFER

SETTING              CANCEL
```

FIG. 9

FILE   EDIT   DISPLAY   FAVORITE   MEDIA

ADDRESS | http://www.printmanager.com/confirmation

CONFIRMATION SCREEN

CAN TRANSFER OF AUTHORITY BE EXECUTED BASED ON FOLLOWING CONTENTS?

<TRANSFER OF ACCOUNTING AUTHORITY>

- TRANSFER DESTINATION USER : user B
- TRANSFER NUMBER : BLACK-AND-WHITE 0 SHEET
  COLOR 15 SHEETS
- VALID NUMBER OF TIMES : 1 TIME
- VALIDITY TERM : OCTOBER 15, 20xx 24:00
- DESIGNATED JOB ID : 1234
- PRINT FORMAT DESIGNATION : YES
  COLOR
  DOUBLE-SIDED
  A4
  2 PAGES/SHEET
- TRANSFER OF PRINT FORMAT SETTING AUTHORITY : YES
  COLOR SETTING AUTHORITY
- MAIL NOTIFICATION TO TRANSFER DESTINATION USER : YES
- COMMENT : I RECEIVE IT IN FRONT OF SCHOOL GATE AT 12:00

TRANSFER INFORMATION ID adu 3f60dqz

[ EXECUTE ]   [ RETURN ]   [ CANCEL ]

FIG. 12

| | |
|---|---|
| TRANSFER INFORMATION ID (E.G., adu3f60dqz) | 1201 |
| TRANSFER SOURCE USER ID (E.G., user A) | 1202 |
| TRANSFER SOURCE USER ID (E.G., user B) | 1203 |
| TRANSFER NUMBER | BLACK-AND-WHITE (E.G., 0 SHEET) | 1204 |
| | COLOR (E.G., 15 SHEETS) | 1205 |
| VALID NUMBER OF TIMES (E.G., 1 TIME) | 1206 |
| VALIDITY TERM (E.G., 20xx/10/15 24:00) | 1207 |
| TARGET PRINT JOB ID (E.G., 1234) | 1208 |
| PRINT FORMAT DESIGNATION | YES/NO | 1209 |
| | COLOR DESIGNATION (E.G., COLOR) | 1210 |
| | DOUBLE-SIDED DESIGNATION (E.G., DOUBLE-SIDED) | 1211 |
| | LAYOUT DESIGNATION (E.G., 2 PAGES/SHEET) | 1212 |
| TRANSFER OF PRINT FORMAT SETTING AUTHORITY | YES/NO | 1213 |
| | COLOR SETTING (E.G., ASSIGN) | 1214 |
| | DOUBLE-SIDED SETTING (E.G., NOT ASSIGN) | 1215 |
| | LAYOUT SETTING (E.G., ASSIGN) | 1216 |

FIG. 13

```
FROM: PrintManager@○○○.com
TO: userB@△△△.com
SUBJECT: TRANSFER INFORMATION MAIL THERE IS FOLLOWING TRANSFER FROM user A TRANSFER SOURCE USER ID            : user A
TRANSFER DESTINATION USER ID       : user B
TRANSFER INFORMATION ID            : adu3f60dqz
TRANSFER NUMBER                    : BLACK-AND-WHITE 0 SHEET   COLOR 15 SHEETS
VALID NUMBER OF TIMES              : 1 TIME
ISSUE DATE AND TIME                : OCTOBER 15, 20xx  09:00
VALIDITY TERM                      : OCTOBER 15, 20xx  24:00
TARGET PRINT JOB ID                : 1234
PRINT FORMAT DESIGNATION           : COLOR DOUBLE-SIDED  A4  2 PAGES/SHEET
TRANSFER OF PRINT FORMAT
SETTING AUTHORITY                  : COLOR SETTING
COMMENT FROM user A                : I RECEIVE IT IN FRONT OF SCHOOL GATE AT 12:00
```

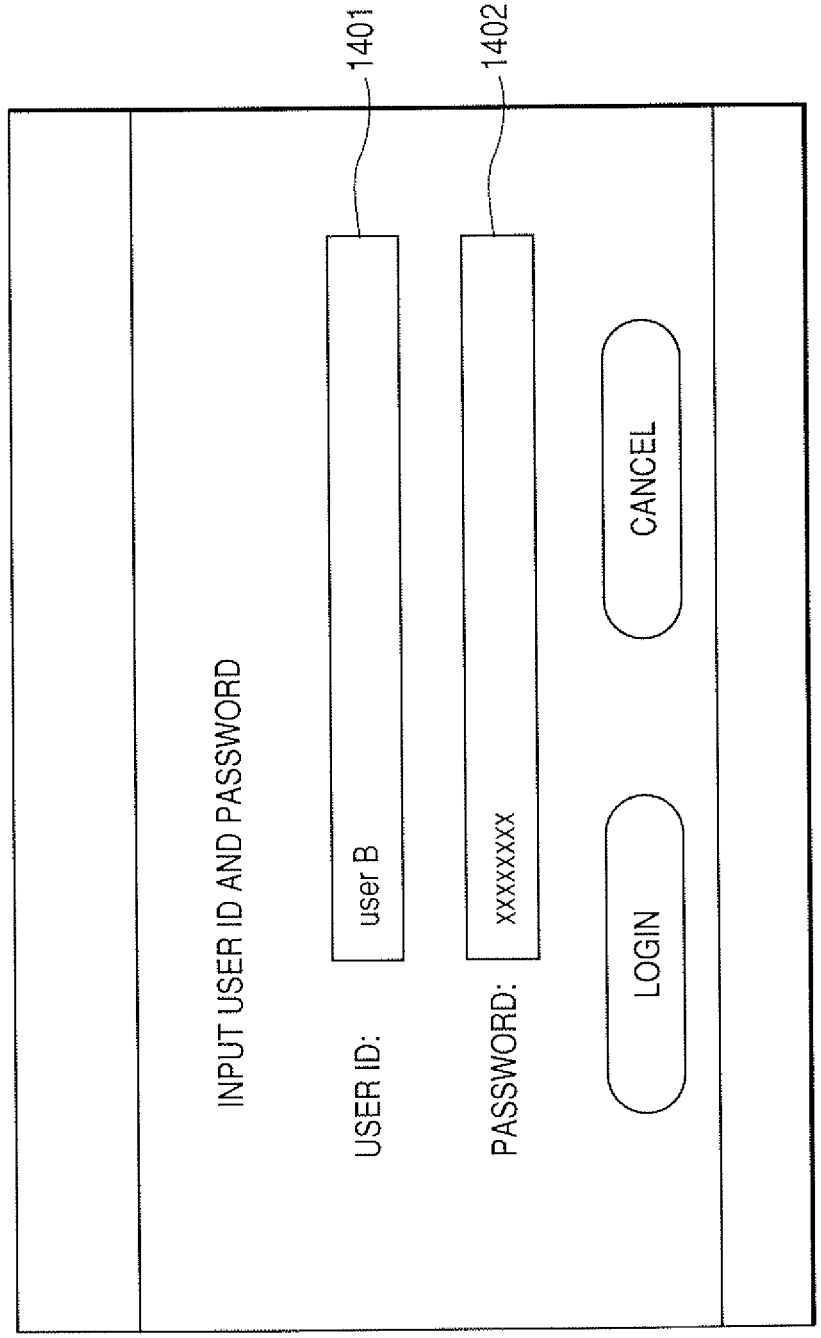

FIG. 16

PULL PRINT SERVICE

| COPY | FAX |

PRINT JOB SELECTION SCREEN    SELECT PRINT JOB

USER ID: user B

FOLDER DESIGNATION: SHARED FOLDER FOR STUDENTS ▼
PERSONAL FOLDER FOR user B

PRINT JOB LIST

| JOB ID | | REGISTRATION DATE | REGISTRANT | SIZE/COLOR | NUMBER OF PAGES | NUMBER OF COPIES |
|---|---|---|---|---|---|---|
| 1234 | FIRST-TERM REPORT.doc | 20xx/xx/xx | user A | A4/COLOR | 12 SHEETS | 2 ◀▶ |
| 1257 | MATERIAL FOR DISCLOSURE.ppt | 20xx/xx/xx | user B | A3/BLACK-AND-WHITE | 5 SHEETS | |
| 1378 | TIMETABLE.xls | 20xx/xx/xx | user B | A4/BLACK-AND-WHITE | 2 SHEETS | 1 ◀▶ |
| 2245 | PHOTOGRAPH IN CAMP.jpg | 20xx/xx/xx | user C | A4/COLOR | 2 SHEETS | |

JOB ID: 1234    OK (REQUEST TRANSFER) — 1601
(CHANGE PRINT FORMAT) — 1602
(PRINT) — 1603
(LOGOUT) — 1604

| PULL PRINT SERVICE | COPY | FAX |

USER CHANGE SCREEN

USER ID: user B

SELECT USER CHANGE JOB

- FIRST-TERM REPORT.doc    [1] /2 COPIES
- TIMETABLE.xls    [0] /1 COPY

INPUT TRANSFER INFORMATION

● TRANSFER INFORMATION ID: [adu3i60dqz] — 1801

○ USER ID: [user A] — 1802

COMMENT: [WHEN SHOULD I ASSIGN IT?]

ACKNOWLEDGMENT WAITING PERIOD [ ] DAYS — 1803

( SET )  ( CANCEL )

FIG. 19

| NO. | CONFIRMATION ITEMS |
|---|---|
| 1-a | DOES ACCOUNTING ACKNOWLEDGMENT INFORMATION CORRESPONDING TO DESIGNATED TRANSFER INFORMATION ID EXIST? |
| 2-a | IN CASE OF COLOR PRINTING OF DESIGNATED JOB, IS PRINT NUMBER SMALLER THAN TRANSFER NUMBER (COLOR)? |
| 3-a | IN CASE OF BLACK-AND-WHITE PRINTING OF DESIGNATED JOB, IS PRINT NUMBER SMALLER THAN TRANSFER NUMBER (BLACK-AND-WHITE)? |
| 4-a | IS REMAINING NUMBER OF TRANSFER SOURCE USER LARGER THAN TRANSFER NUMBER? |
| 5-a | DOES PRINT INDICATION USER CONFORM TO TRANSFER DESTINATION USER? |
| 6-a | DOES NUMBER EXCEED VALID NUMBER OF TIMES OF TRANSFER INFORMATION? |
| 7-a | IS CURRENT DATE AND TIME WITHIN VALIDITY TERM? |
| 8-a | DOES DESIGNATED JOB CONFORM TO PRINT TARGET JOB ID DESIGNATED BY TRANSFER SOURCE USER? |
| 9-a | DOES DESIGNATED JOB CONFORM TO PRINT FORMAT DESIGNATED BY TRANSFER SOURCE USER? |
| 10-a | DOES USER ID CORRESPONDING TO TRANSFER SOURCE USER ID EXIST? |

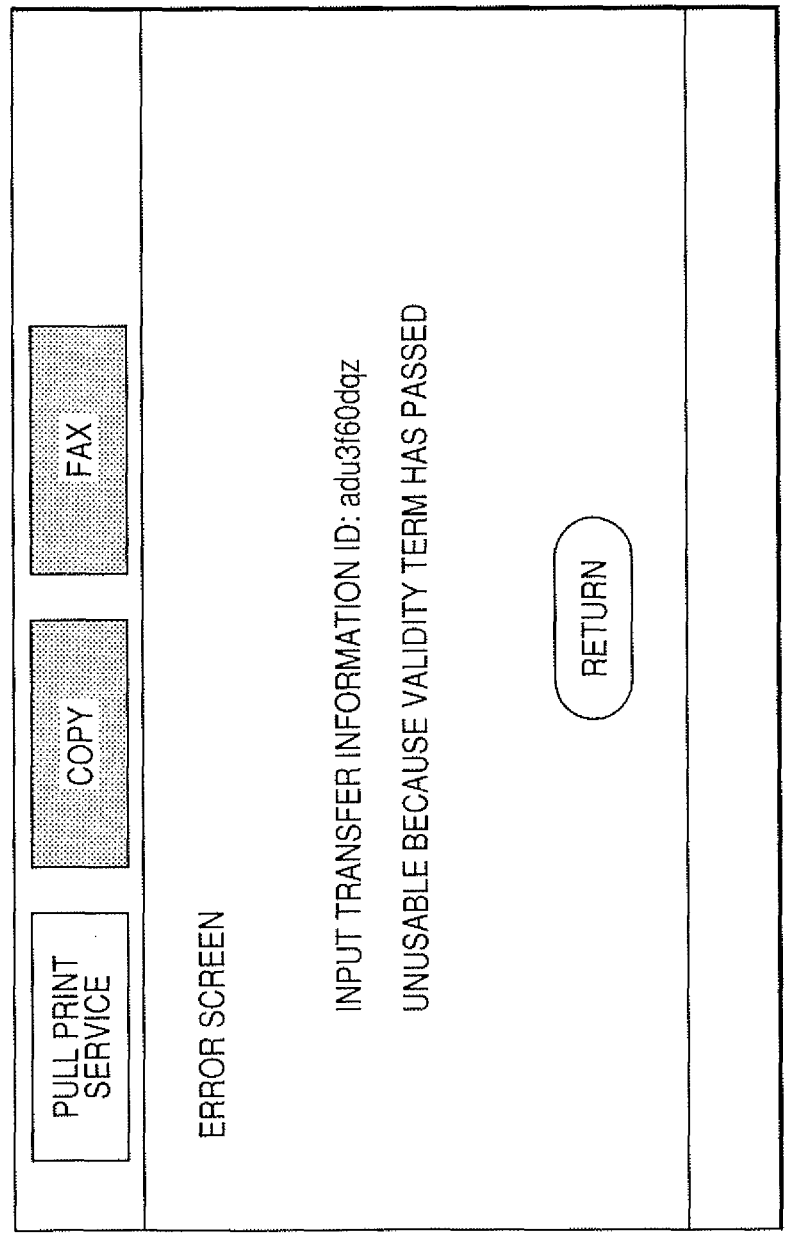

FIG. 21

| NO. | ERROR MESSAGES |
|---|---|
| 1-b | THERE IS NO TRANSFER INFORMATION CORRESPONDING TO DESIGNATED TRANSFER INFORMATION ID |
| 2-b | UNUSABLE BECAUSE COLOR PRINT NUMBER OF DESIGNATED JOB EXCEEDS TRANSFER NUMBER (COLOR) |
| 3-b | UNUSABLE BECAUSE BLACK-AND-WHITE PRINT NUMBER OF DESIGNATED JOB EXCEEDS TRANSFER NUMBER (BLACK-AND-WHITE) |
| 4-b | UNUSABLE BECAUSE TRANSFER NUMBER EXCEEDS REMAINING NUMBER OF TRANSFER SOURCE USER |
| 5-b | UNUSABLE BECAUSE PRINT INDICATION USER DOES NOT CONFORM TO TRANSFER DESTINATION USER |
| 6-b | UNUSABLE BECAUSE NUMBER EXCEEDS VALID NUMBER OF TIMES |
| 7-b | UNUSABLE BECAUSE VALIDITY TERM HAS PASSED |
| 8-b | UNUSABLE BECAUSE DESIGNATED JOB DOES NOT CONFORM TO JOB DESIGNATED BY TRANSFER SOURCE USER |
| 9-b | UNUSABLE BECAUSE DESIGNATED JOB DOES NOT CONFORM TO PRINT FORMAT DESIGNATED BY TRANSFER SOURCE USER |
| 10-b | USER CORRESPONDING TO DESIGNATED TRANSFER SOURCE USER ID DOES NOT EXIST |

FIG. 22

```
FROM: PrintManager@○○○.com
TO: userA@△△△.com
SUBJECT: USER CHANGE REQUEST
THERE IS USER CHANGE REQUEST FROM user B REQUESTER                    : user B
PRINT JOB NAME               : FIRST-TERM REPORT.doc
PRINT JOB ID                 : 1234
PRINT JOB INFORMATION        : 12 PAGES COLOR
PRINT FORMAT SETTING         : BLACK-AND-WHITE  DOUBLE-SIDED  A4  2 PAGES/SHEET
USE INFORMATION              : BLACK-AND-WHITE  3 SHEETS
(BEFORE USE)
ACCUMULATED NUMBER/          : BLACK-AND-WHITE 67/100 SHEETS
UPPER LIMIT NUMBER             COLOR 32/50 SHEETS
PRINT DATE AND TIME          : OCTOBER 15, 20xx  11:15
ACKNOWLEDGMENT TERM          : OCTOBER 16, 20xx  11:15

COMMENT FROM user A          : WHEN SHOULD I ASSIGN IT?

ACCESS HERE IN CASE OF ACKNOWLEDGMENT    http://printmanager/chargeOK    —— 2201
ACCESS HERE IN CASE OF REFUSAL           http://printmanager/chargeNG    —— 2202
```

*FIG. 23*

| NUMBER OF USED SHEETS | NUMBER OF USED SHEETS FOR BLACK-AND-WHITE (E.G., 0 SHEET) | 2301 |
| --- | --- | --- |
| | NUMBER OF USED SHEETS FOR COLOR (E.G., 3 SHEETS) | 2302 |
| PRINT PERSON'S ID (E.G., user B) | | 2303 |
| TRANSFER INFORMATION ID (E.G., adu3f60dqz) | | 2304 |
| USER ID (E.G., user A) | | 2305 |
| PRINT JOB NAME (E.G., FIRST-TERM REPORT.doc) | | 2306 |
| JOB ID (E.G., 1234) | | 2307 |
| PRINT JOB INFORMATION (E.G., 12 SHEETS COLOR) | | 2308 |
| PRINT FORMAT SETTING (E.G., COLOR, DOUBLE-SIDED, 2 PAGES/SHEET) | | 2309 |
| PRINT DATE AND TIME (E.G., 20xx/10/15 11:15) | | 2310 |

FIG. 24

FROM: PrintManager@○○○.com
TO: userA △△△.com
SUBJECT: COUNT COMPLETION MAIL

COUNTING OF FOLLOWING NUMBER OF USED SHEETS COMPLETES FOR user A

| | |
|---|---|
| PRINT PERSON | : user B |
| TRANSFER INFORMATION ID | : abu3f60dqz |
| PRINT DATE AND TIME | : OCTOBER 15, 20xx 11:15 |
| PRINT JOB NAME | : FIRST-TERM REPORT.doc |
| PRINT JOB ID | : 1234 |
| PRINT JOB INFORMATION | : 12 PAGES COLOR |
| PRINT FORMAT SETTING | : COLOR DOUBLE-SIDED A4 2 PAGES/SHEET |
| COUNT INFORMATION (AFTER COUNT) | : COLOR 3 SHEETS |
| ACCUMULATED NUMBER/ UPPER LIMIT NUMBER | : BLACK-AND-WHITE 67/100 SHEETS COLOR 35/50 SHEETS |

INFORMATION PROCESSING DEVICE, COUNTING METHOD, AND COMPUTER PROGRAM

BACKGROUND OF THE INVENTION

1. Field of the Invention

The present invention relates to an information processing device which monitors a use condition of a data processing device, counts use amounts of the data processing device with respect to each user or each group to which the users belong, and manages the counted amount, to a counting method which is applied to the information processing device, and to a computer program which corresponds to the counting method.

2. Description of the Related Art

In an environment that a data processing device is used by plural users, a system which counts and thus manages use amounts of the data processing device with respect to each user or the group to which the users belong is used.

Ordinarily, the system of this type causes the user to input authentication information when he/she uses the data processing device, so that the user who actually uses the data processing device is discriminated by such user authentication. Then, the system counts the use amounts with respect to each discriminated user.

Incidentally, in the system of this type, for example, there is a case where a first user asks a second user to execute a data process. In that case, if the second user uses the data processing device to execute the relevant process, it is desirable to count the use amount of the data processing device by the second user as the use amount by the first user.

To cope with such a request, for example, it is assumed that the first user notifies the second user of the authentication information (for example, a set of user ID and password, an authentication card, or the like) of the first user himself/herself. However, there is a fear in such a case that the notified authentication information is improperly or illegally used.

Thus, one technique is proposed as in, for example, Japanese Patent Application Laid-Open No. 2004-276271. In Japanese Patent Application Laid-Open No. 2004-276271, a user who asks another user to operate an image forming device previously forms a representative sheet, the image forming device judges whether or not to permit a representative operation based on both the authentication of the user who was asked to operate the device and the read result of the representative sheet, whereby it is possible for one user to ask another user to execute a substitutive operation without lending his/her authentication card.

In such a related background art, it is necessary for one user (called a first user) to previously prepare the count of use amounts in a case where another user (called a second user) uses a data processing device, as the count of use amounts corresponding to the first user. On the other hand, the second user has to wait until the relevant previous preparation by the first user ends. That is, in the related background art, after the second user designated the first user as the partner from which the use amount is given, even if the use amounts in the case where the second user uses the data processing device are counted by permission of the first user, the relevant amounts cannot resultingly be counted as the use amounts corresponding to the first user.

SUMMARY OF THE INVENTION

An object of the present invention is to be able to, after a second user designated a first user, count a use amount in a case where the second user uses a data processing device by permission of the first user, as a use amount corresponding to the first user.

According to a first aspect of the present invention, there is provided an information processing device which counts a use amount at a time when a user uses a data processing device, as the use amount corresponding to said user, the device comprising:

an input unit adapted to input discrimination information of a first user;

an acquisition unit adapted to, after the discrimination information is input by the input unit, acquire permission to count the use amount at a time when a second user uses the data processing device, as the use amount corresponding to the first user, from the first user; and a counting unit adapted to, in a case where the permission is acquired by the acquisition unit, count the use amount at the time when the second user uses the data processing device, as the use amount corresponding to the first user.

According to a second aspect of the present invention, there is provided an information processing device comprising:

a first input unit adapted to input discrimination information of a user who uses a data processing device;

a second input unit adapted to input an indication for causing to acquire permission to count a use amount at a time when the user uses the data processing device as a use amount corresponding to another user;

a third input unit adapted to input discrimination information of the relevant another user; and a counting unit adapted to count, in a case where there is a user request by a request unit, the use amount at the time when the user uses the data processing device, as the use amount corresponding to the relevant another user, and to count, in a case where there is no user request by the request unit, the use amount at the time when the user uses the data processing device, as the use amount corresponding to the user.

Other features, objects and advantages of the present invention will be apparent from the following description when taken in conjunction with the accompanying drawings, in which like reference characters designate the same or similar parts throughout the figures thereof.

Further features of the present invention will become apparent from the following description of exemplary embodiments.

BRIEF DESCRIPTION OF THE DRAWINGS

FIG. 1 is a block diagram showing the constitution of the information processing system according to the embodiment of the present invention;

FIG. 2 is a diagram showing an example of the screen which is displayed on the first client PC (personal computer) according to the embodiment;

FIG. 4 is a diagram showing an example of the print job information which is managed by the pull print server according to the embodiment;

FIG. 5 is a diagram showing an example of the print number information which is managed by the output management server according to the embodiment;

FIG. 7 is a diagram showing an example of the screen which is displayed on the second client PC according to the embodiment;

FIG. 8 is a diagram showing an example of the screen which is displayed on the second client PC according to the embodiment;

FIG. 9 is a diagram showing an example of the screen which is displayed on the second client PC according to the embodiment;

FIG. 12 is a diagram showing an example of transfer information which is generated by the output management server according to the embodiment;

FIG. 13 is a diagram showing an example of a transfer information mail which is transmitted by the output management server according to the embodiment;

FIG. 14 is a diagram showing an example of the screen which is displayed on the image forming device according to the embodiment;

FIG. 16 is a diagram showing an example of the screen which is displayed on the image forming device according to the embodiment;

FIG. 18 is a diagram showing an example of the screen which is displayed on the image forming device according to the embodiment;

FIG. 19 is a diagram showing an example of the effectiveness confirmation items of the transfer information ID according to the embodiment;

FIG. 20 is a diagram showing an example of the error screen which is displayed on the image forming device according to the embodiment;

FIG. 21 is a diagram showing an example of the messages which are displayed on the error screen by the image forming device according to the embodiment;

FIG. 22 is a diagram showing an example of the transfer request mail which is transmitted by the output management server according to the embodiment;

FIG. 23 is a diagram showing an example of the use information which is transmitted by the image forming device according to the embodiment;

FIG. 24 is a diagram showing an example of the count end mail which is transmitted by the output management server according to the embodiment;

DESCRIPTION OF THE EMBODIMENTS

Figure 3:
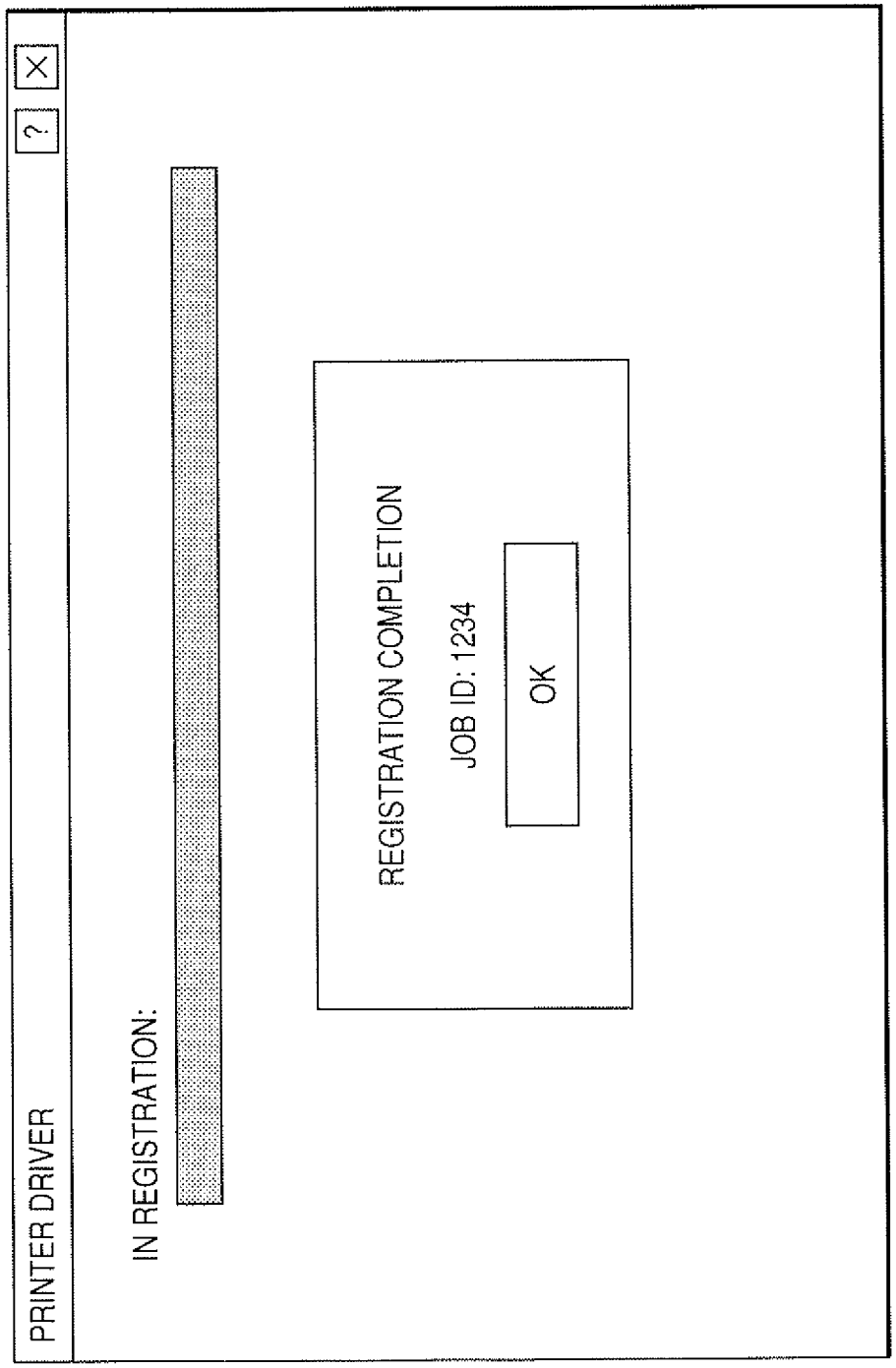
FIG. 3 is a diagram showing an example of the screen which is displayed on the first client PC according to the embodiment.

Hereinafter, the embodiments of the present invention will be explained in detail with reference to the accompanying drawings.

First Embodiment

FIG. 1 is a block diagram showing the constitution of the information processing system according to the first embodiment of the present invention.

In the information processing system shown in FIG. 1, a first client PC 101, a pull print server 102 and a second client PC 103 are connected so as to be able to mutually communicate to others through a network 108. Moreover, an output management server 104, a third client PC 105, a portable terminal 106 and an image forming device 107 are connected to be able to mutually communicate to others through the network 108.

Here, it should be noted that the information processing system according to the present embodiment is the system which can achieve the function (so called a pull print function) that the client PC previously registers a print job to the server and then the image forming device acquires and prints the registered print job.

In the information processing system shown in FIG. 1, each of the first client PC 101, the second client PC 103 and the third client PC 105 is the information processing device which is operated and handled by a user. Here, it should be noted that a portable terminal such as a PDA (Personal Digital Assistant), a cellular telephone or the like can be used as the relevant information processing device. The pull print server 102 is the information processing device which, in the pull print function, manages the print jobs transmitted from the client PC's 101, 103 and 105 and transmits the print job in response to a request from the image forming device 107. The output management server 104 is the information processing device which has the function of monitoring the use condition of the data processing device, and counting and managing a use amount in case of the data process by using the data processing device with respect to each user or each group to which the users belong. In the present embodiment, the image forming device will be explained as an example of the data processing device to be managed. Thus, the output management server 104 in the present embodiment monitors the use condition of the image forming device 107, and manages the number of prints (also called print number hereinafter) and the upper-limit number of prints (also called upper-limit print number hereinafter). More specifically, a printer, a scanner, a facsimile machine, a copy machine, an MFP (Multi Function Peripheral) or the like can be used as the image forming device 107. Incidentally, when the image forming device 107 is actually used, it is necessary for the user thereof to acquire user authentication or group authentication of the group to which the relevant user belongs. Besides, it should be noted that a LAN (local area network), a wireless LAN, the Internet or the like can be used as the network 108.

As shown in FIG. 1, the first client PC 101 is equipped with a network communication unit 101a, a control unit 101b and a print job generation unit 101c.

Further, the second client PC 103 is equipped with a network communication unit 103a, a control unit 103b and a Web browser 103c.

Furthermore, the pull print server 102 is equipped with a network communication unit 102a, a control unit 102b, a job information management unit 102c, and a job information storage unit 102d. Here, a shared/individual folder 102e is managed in the job information storage unit 102*d*, and job information 102*f* is stored in the shared/individual folder 102*e*.

Moreover, the output management server 104 is equipped with a network communication unit 104*a*, a control unit 104*b*, a transfer information issue request reception unit 104*c*, a print number information management unit 104*d* (here, it should be noted that "print number" in this case implies "the number of prints"), a transfer information issue unit 104*g*, and a transfer information management unit 104*h*. In addition, the output management server 104 is equipped with a mail creation unit 104*k*, a print number information storage unit 104*e* (here, it should be noted that "print number" in this case implies "the number of prints"), and a transfer information storage unit 104*i*. Here, print number information 104*f* (here, it should be noted that "print number" in this case implies "the number of prints") for each user is stored in the print number information storage unit 104*e*, and transfer information 104*j* is stored in the transfer information storage unit 104*i*.

Moreover, the image forming device 107 is equipped with a network control unit 107*a*, a control 107*b*, a display unit 107*c*, an operation unit 107*d*, an image forming unit 107*e*, an external device I/F (interface) 107*f*, a storage unit 107*n*, and a device ID 107*t*. Here, use information 107*m* of the image forming device 107 for each user is stored in the storage unit 107*n*. Moreover, as the functional constitution for authenticating a user, the image forming device 107 is equipped with an IC card reader 107*g*, a infrared reader 107*h*, a USB (Universal Serial Bus) I/F 107*i*, a two-dimensional barcode I/F 107*j*, and a biometrics authentication I/F 107*k*.

In the information processing system according to the present embodiment, the first client PC 101 transmits predetermined print data to the pull print server 102. Here, FIG. 2 shows the screen which is displayed on the first client PC 101 and used to indicate to generate a print job. Thus, a user inputs through the screen shown in FIG. 2 the information of the predetermined print job to be registered in the pull print server 102. Then, the print job generation unit 101*c* of the first client PC 101 generates the print job based on the input information, and the control unit 101*b* causes the network communication unit 101*a* to transmit to the pull print server 102 the print job generated by the print job generation unit 101*c*. Subsequently, the pull print server 102 manages the print data (print job) transmitted from the first client PC 101. Here, it should be noted that the pull print server 102 manages the print job transmitted from the first client PC 101, based on the format shown in FIG. 4. If the print job is registered by the pull print server 102, the screen shown in FIG. 3 is illustrated on the first client PC 101, whereby the user who indicated to register the print job can confirm the completion of the registration, a relevant job ID, and the like.

The second client PC 103 requests the output management server 104 to generate the transfer information for transferring the use amount of the image forming device 107, and further sets the contents of the transfer information. Here, it should be noted that the transfer information is the information which is used to transfer the use amount of the image forming device, and the use amount is equivalent to, for example, the print number (that is, the number of prints. Moreover, it should be noted that the transfer information includes the information such as an ID of the user from which the use amount is transferred, an ID of the user to which the use amount is transferred, and the like. For example, it is assumed that the printing is executed by the image forming device 107 based on the transfer information representing that the transfer number (that is, the number of transfers) is equivalent to ten sheets, that is, it is assumed that the transfer of the use amount "ten sheets" is executed. In this case, even if the user who actually indicated the printing is a user B, the use amount "ten sheets" of the image forming device is counted as the use amount corresponding to a user A. Here, it should be noted that the user A at that time is called a transfer source user and the user B is called a transfer destination user. Also, it should be noted that the transfer of the use amount is to count the use amount at the time when one user uses the image forming device 107, as the use amount corresponding to another user. In response to the indication by a user, the image forming device 107 acquires and prints the print data managed in the pull print server 102. Moreover, the image forming device 107 transmits the use information thereof to the output management server 104. Then, the output management server 104 manages the use condition of the image forming device 107 with respect to each user or each group to which the users belong. Moreover, the output management server 104 counts the use amount corresponding to a predetermined user according as the transfer information ID or the transfer source user ID is transmitted from the image forming device 107.

In the following, the operation of the information processing system according to the present embodiment will be explained in detail with reference to a flow chart.

Figure 25:
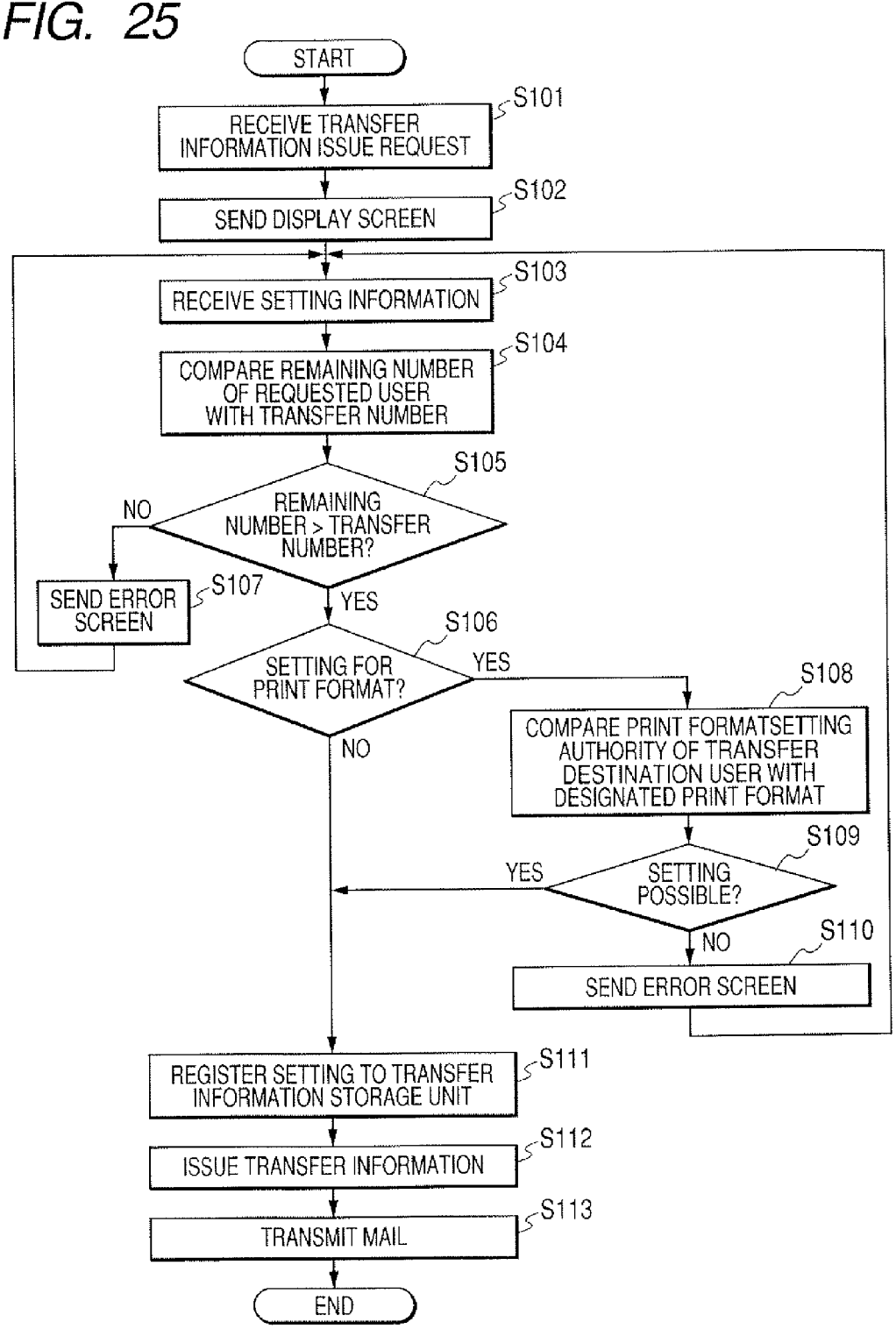
FIG. 25 is a flow chart showing the operation of the output management server according to the embodiment.

FIG. 25 is a flow chart showing the operation of the output management server 104 in a case where a transfer information issue request is sent from the second client PC 103 to the output management server 104.

Here, it should be noted that the processes in the respective steps of the flow chart shown in FIG. 25 are executed by the control unit 104*b* of the output management server 104 which controls the respective function units.

Figure 6:
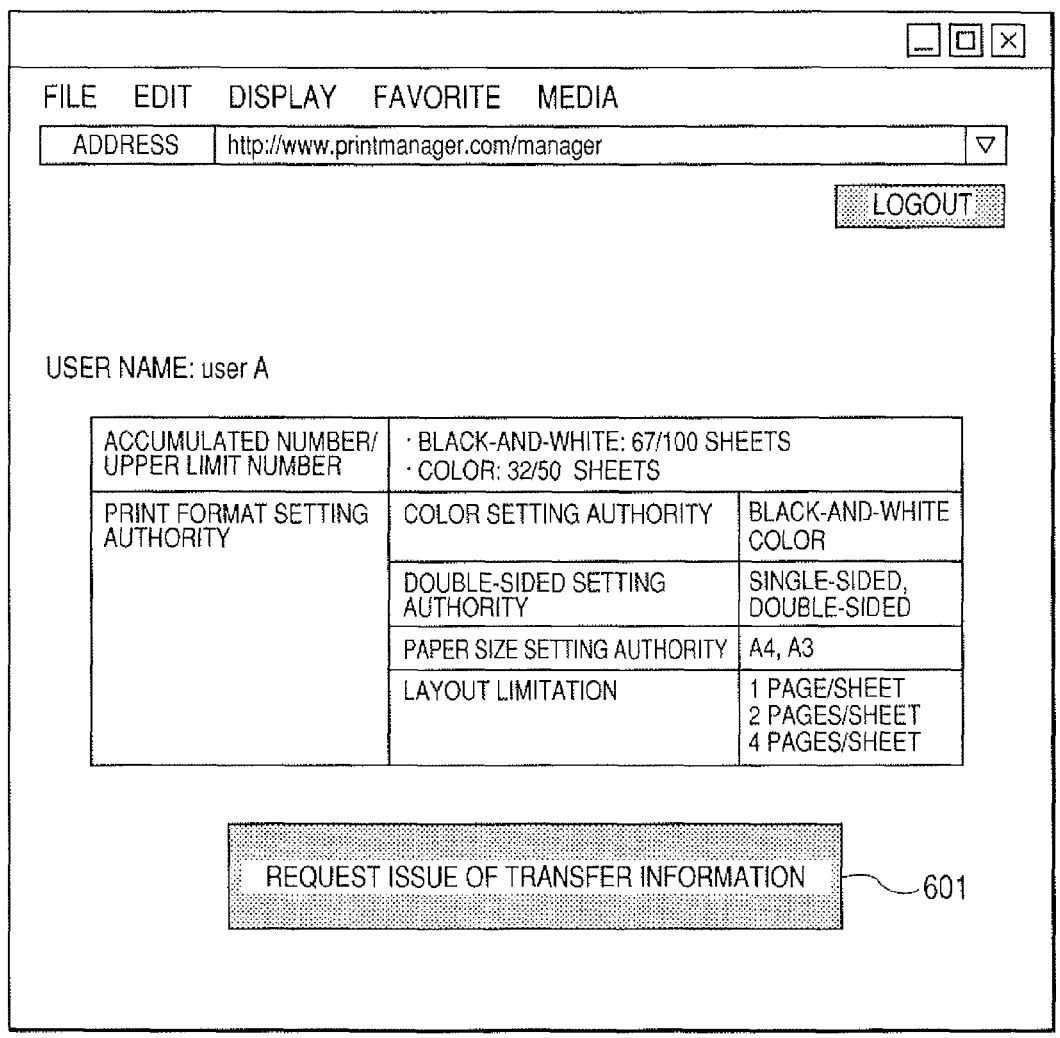
FIG. 6 is a diagram showing an example of the screen which is displayed on the second client PC according to the embodiment.

First, if the user designates and clicks an issue request button 601 of the screen of FIG. 6 which is displayed on the Web browser of the second client PC 103, the transfer information issue request is transmitted from the second client PC 103. FIG. 6 shows an example of the screen which is displayed at that time on the Web browser of the second client PC 103, and it should be noted that the screen shown in FIG. 6 is displayed by accessing, with use of the output management server 104, a predetermined Web page provided by a built-in Web server (not shown) through the Web browser of the second client PC 103. In FIG. 6, the address of the Web page is described in the address section. Incidentally, the information which is selected from the information administrated with respective to each user in the output management server 104 and represents the user who accessed the relevant Web page by using the second client PC 103 is displayed on the relevant Web page together with the issue request button 601 for executing the transfer information issue request.

In a step S101, the network communication unit 104*a* receives the transfer information issue request transmitted from the second client PC 103.

Subsequently, in a step S102, the transfer information issue request reception unit 104*c* transmits the display screen shown in FIG. 7 to the second client PC 103 through the network communication unit 104*a*, according to the transfer information issue request received in the step S101. Here, it should be noted that the display screen shown in FIG. 7 is the screen which is used to set the transfer information.

The Web browser 103*c* of the second client PC 103 displays the screen transmitted from the output management server 104 in the step S102. Thus, the user who operates or handles the second client PC 103 can set the transfer information by selecting desired items and/or inputting desired values on the screen shown in FIG. 7.

The example shown in FIG. 7 provides the setting for transferring the color printing of 15 sheets from the user A to the user B, that is, the setting by which the color printing of 15 sheets executed by the user B being the transfer destination user on the image forming device 107 can be counted as the printing of 15 sheets executed by the user A being the transfer source user. Further, in the example shown in FIG. 7, the valid number of times and the validity term of the transfer information can be set, and also the print format can be designated. Thus, the user A can previously decide the print format setting to be used when the user B executes the printing based on the transfer information. Moreover, in case of transferring also a print format setting authority from the user A to the user B, the user A can indicate such transfer by depressing or clicking a button 701 shown in FIG. 7. In addition, the user A can set whether or not to notify the user B of the transfer content through an electronic mail by checking or clicking a check box 703.

FIG. 8 is a diagram showing an example of the screen which is displayed by the Web browser 103c of the second client PC 103. Here, it should be noted that the screen shown in FIG. 8 is displayed in response to the depression of clicking of the button 701 on the screen shown in FIG. 7. More specifically, it is possible on the screen shown in FIG. 8 to set whether or not to transfer the print format setting authority.

The user who operates the second client PC 103 actually operates and handles the screens respectively shown in FIGS. 7 and 8 so as to input the information concerning the transfer information, and then depresses or clicks a button 702 shown in FIG. 7. Thus, the information input by the user is transmitted from the second client PC 103 to the output management server 104.

In a step S103 shown in FIG. 25, the network communication unit 104a receives the information transmitted from the second client PC 103.

Then, in a step S104, the transfer information issue unit 104g extracts the transfer source user name (that is, the user A in the example shown in FIG. 7) and the transfer number, from the information received in the step S103. Further, the print number information management unit 104d searches and extracts the print number information of the transfer source user name extracted by the transfer information issue unit 104g, from the print number information 104f for each user stored in the print number information storage unit 104e. Here, FIG. 5 is a diagram showing an example of the data constitution of the print number information 104f for each user which is stored in the print number information storage unit 104e.

In the print number information shown in FIG. 5, the information which discriminates a user as, for example, a user name is written in an area 501. Further, the password which is made correspondent to the discrimination information in the area 501 is written in an area 502, and the mail address of the user corresponding to the discriminating information in the area 501 is written in an area 503. Furthermore, the upper limit print number which is executable per month by the user discriminated in the area 501 with use of the image forming device 107 is written in each of areas 504 and 505. Here, the upper limit print number for black-and-white printing is written in the area 504, and the upper limit print number for color printing is written in the area 505. Moreover, the print number which is executed this month by the user discriminated in the area 501 with use of the image forming device 107 is written in each of areas 506 and 507. Here, the print number for black-and-white printing is written in the area 506, and the print number for color printing is written in the area 507. Moreover, the remaining printable number (that is, the remaining number of sheets capable of being printed) for this month for the user discriminated in the area 501 is written in each of areas 508 and 509. More specifically, the number which is acquired by subtracting the print number in the area 506 from the print number in the area 504 is written in the area 508, and the number which is acquired by subtracting the print number in the area 507 from the print number in the area 505 is written in the area 509. Moreover, the print format setting authority is written in each of areas 510, 511 and 512. Incidentally, in the example of the print number information for each user shown in FIG. 5, the print number is managed with respect to each month. However, it should be noted that the print number cab be managed with respect to another certain period (for example, each week, each year or the like). Moreover, the information which is managed based on the print number information is not limited to those shown in FIG. 5. That is, it should be noted that another information can be managed based on the print number information.

In the step S104, the transfer number extracted by the transfer information issue unit 104g is compared with the remaining number written in the area 508 or 509 shown in FIG. 5.

Subsequently, in a step S105, the control unit 104b judges based on the comparison result in the step S104 whether or not the remaining printable number of the transfer source user in this month is larger than the transfer number. Then, if it is judged in the step S105 that the remaining printable number in this month is larger than the transfer number, the flow advances to a step S106. On the other hand, if it is judged in the step S105 that the transfer number is larger the remaining printable number in this month, the flow advances to a step S107.

Figure 10:
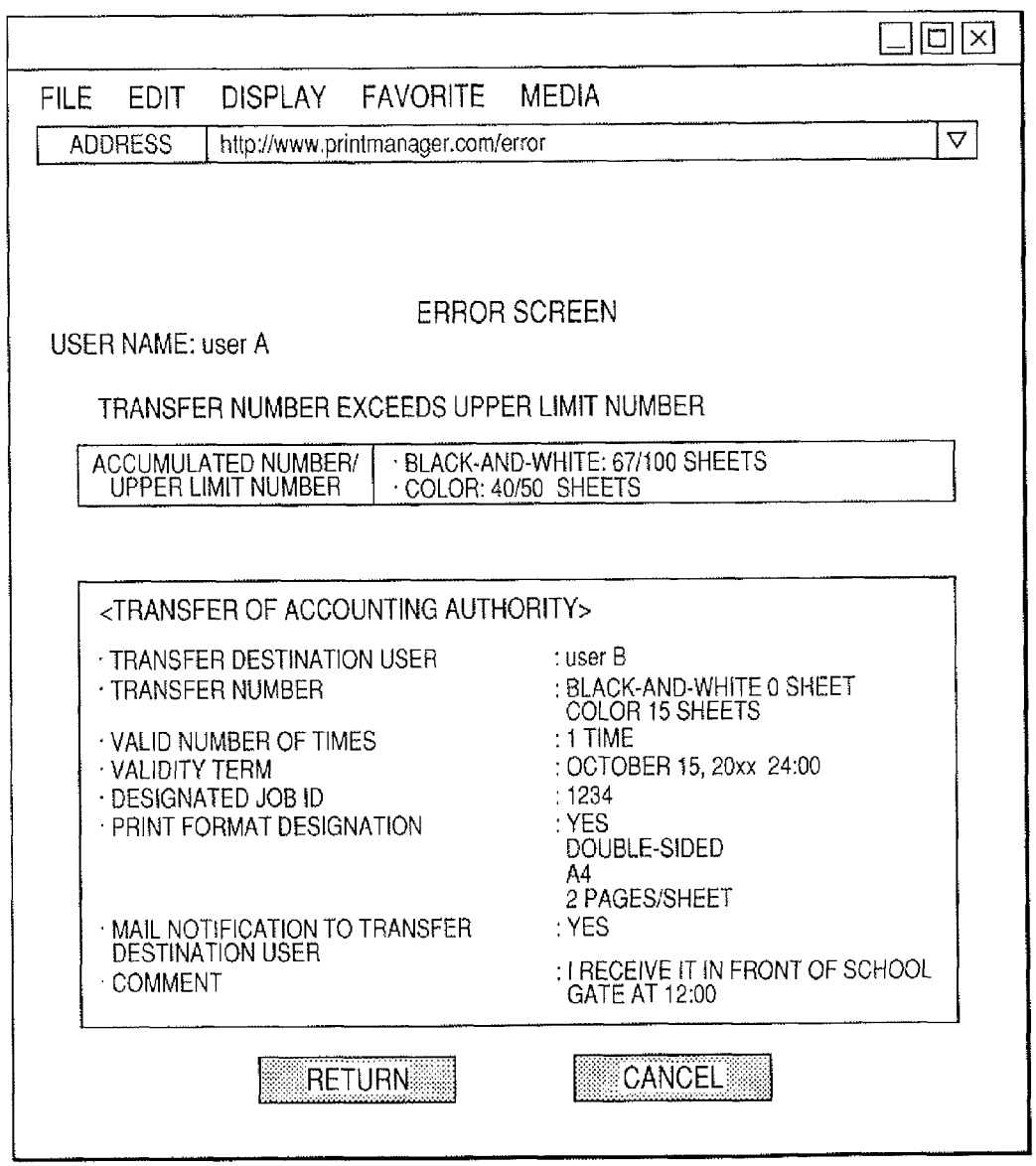
FIG. 10 is a diagram showing an example of the error screen which is displayed on the second client PC according to the embodiment.

In the step S107, the control unit 104b causes the network communication unit 104a to transmit the error display screen shown in FIG. 10 to the second client PC 103.

When the second client PC 103 receives the transmitted error display screen shown in FIG. 10, the received screen is displayed on the Web browser 103c of the second client PC 103, whereby the user of the second client PC 103 can confirm why the transfer information is not issued.

On the other hand, in the step S106, the transfer information issue unit 104g judges, by referring to the information received in the step S103, whether or not a print format has been designated.

Then, if it is judged in the step S106 that the print format has been designated, the flow advances to a step S108. On the other hand, if it is judged that the print format is not designated yet, the flow advances to a step S111.

Subsequently, in the step S108, the control unit 104b judges whether or not the user who is the transfer destination has the authority for setting the print format based on the transfer information. More specifically, the print number information management unit 104d initially searches the print number information storage unit 104e on the basis of the discrimination information for discriminating the transfer destination user, and thus acquires the print number information of the transfer destination user. Then, on the basis of the print format included in the information received in the step S103 and the information written in the areas 510, 511 and 512 of the transfer destination user, it is judged by the control unit 104b in a step S109 whether or not to be able to set the print format included in the received information.

If it is judged in the step S109 to be able to set the print format included in the received information, the flow advances to the step S111. On the other hand, if it is judged not to be able to set the print format included in the received information, the flow advances to a step S110.

Figure 11:
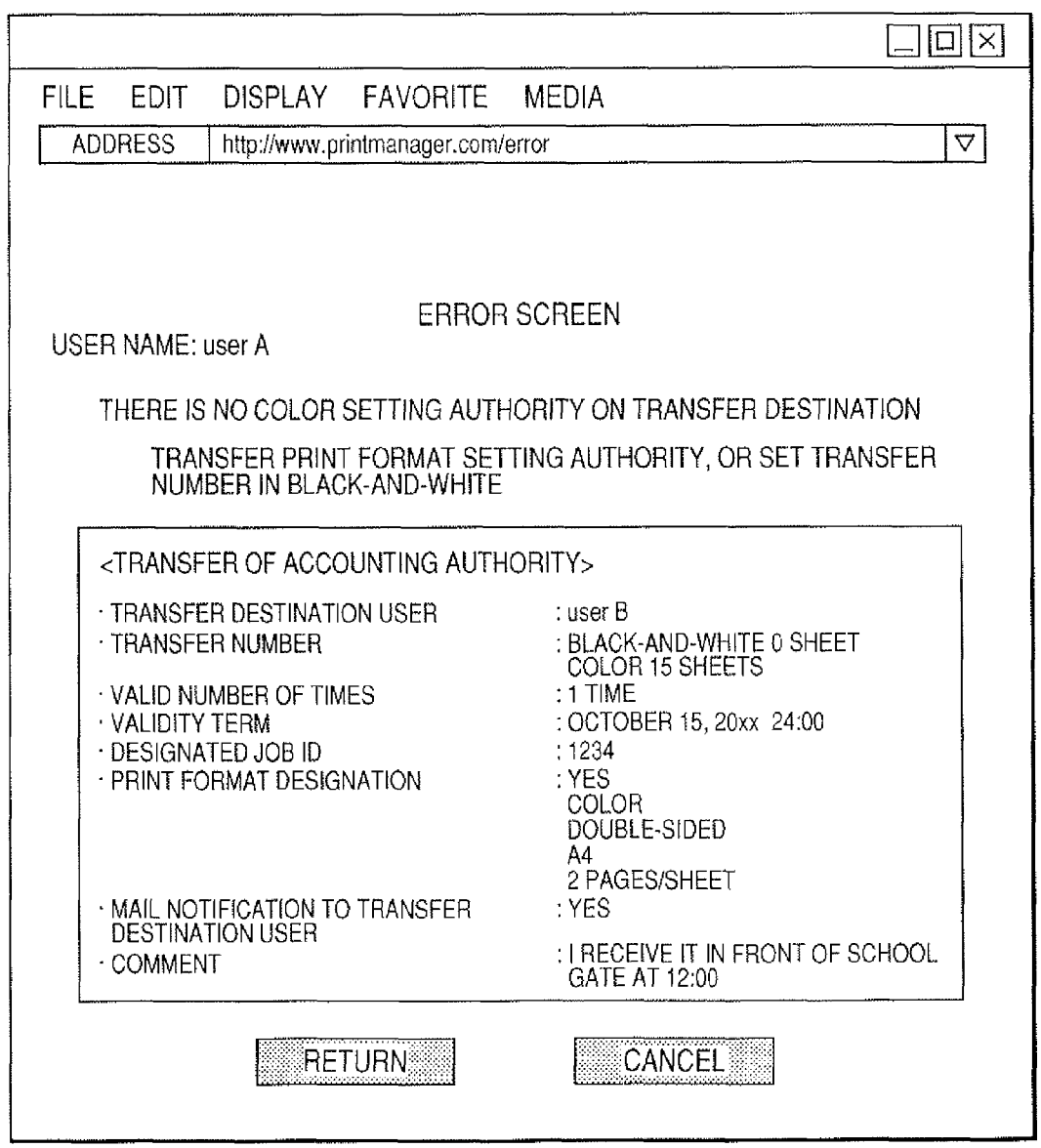
FIG. 11 is a diagram showing an example of the error screen which is displayed on the second client PC according to the embodiment.

In the step S110, the control unit 104b causes the network communication unit 104a to transmit the error display screen shown in FIG. 11 to the second client PC 103.

When the second client PC 103 receives the transmitted error display screen shown in FIG. 11, the received screen is displayed on the Web browser 103c of the second client PC 103, whereby the user of the second client PC 103 can confirm why the transfer information is not issued.

In the step S111, the transfer information issue unit 104g generates the transfer information on the basis of the information received in the step S103. Then, the transfer information management unit 104h stores in the transfer information storage unit 104i the transfer information generated by the transfer information issue unit 104g.

FIG. 12 is a diagram showing an example of the transfer information generated by the transfer information issue unit 104g. In FIG. 12, a transfer information ID is written in an area 1201. Here, it should be noted that the transfer information ID is the identification which is used to discriminate the transfer information generated by the transfer information issue unit 104g, and the transfer information ID is actually issued by the transfer information issue unit 104g when the transfer information is generated. Further, a user ID of the transfer source user is written in an area 1202, a user ID of the transfer destination user is written in an area 1203, the transfer number for black-and-white printing is written in an area 1204, and the transfer number for color printing is written in an area 1205. Moreover, the valid number of times for the transfer information is written in an area 1206. Here, it should be noted that the valid number of times for the transfer information is the information which is used by the transfer destination user to set, with respect to each transfer information, the number of times by which the printing using the transfer information can be executed. Further, a validity term of the transfer information is written in an area 1207. Furthermore, a print job ID of the print job to be transferred is written in an area 1208, when the transfer source user inputs the job ID to a section 704 shown in FIG. 7 in case of registering the transfer information. Meanwhile, if the transfer source user does not input the job ID to the section 704 shown in FIG. 7, any information is not written in the area 1208. Further, the information concerning the print format designation is written in each of areas 1209, 1210, 1211 and 1212, and the information concerning the print format setting authority transfer is written in each of areas 1213, 1214, 1215 and 1216.

In a step S112, the transfer information issue unit 104g causes the network communication unit 104a to transmit the display screen showing the generated transfer information to the second client PC 103. When the second client PC 103 receives the transmitted display screen, the display screen shown in FIG. 9 is displayed on the Web browser 103c of the second client PC 103, whereby the transfer source user can know that the transfer information was issued from the output management server 104 and can also know the transfer information ID of the issued transfer information.

In a step S113, the mail creation unit 104k creates the mail (E-mail) shown in FIG. 13 so as to cause the transfer destination user to recognize that the transfer information was issued. Here, the mail creation unit 104k sets, as the destination of the created mail, the mail address, written in the area 503 of the print number information, corresponding to the transfer destination user. Thus, the transfer destination user can know that the transfer information was issued and can also know the transfer information ID of the issued transfer information, and the transfer destination user can receive the transfer by using the transfer information ID.

Figure 26:
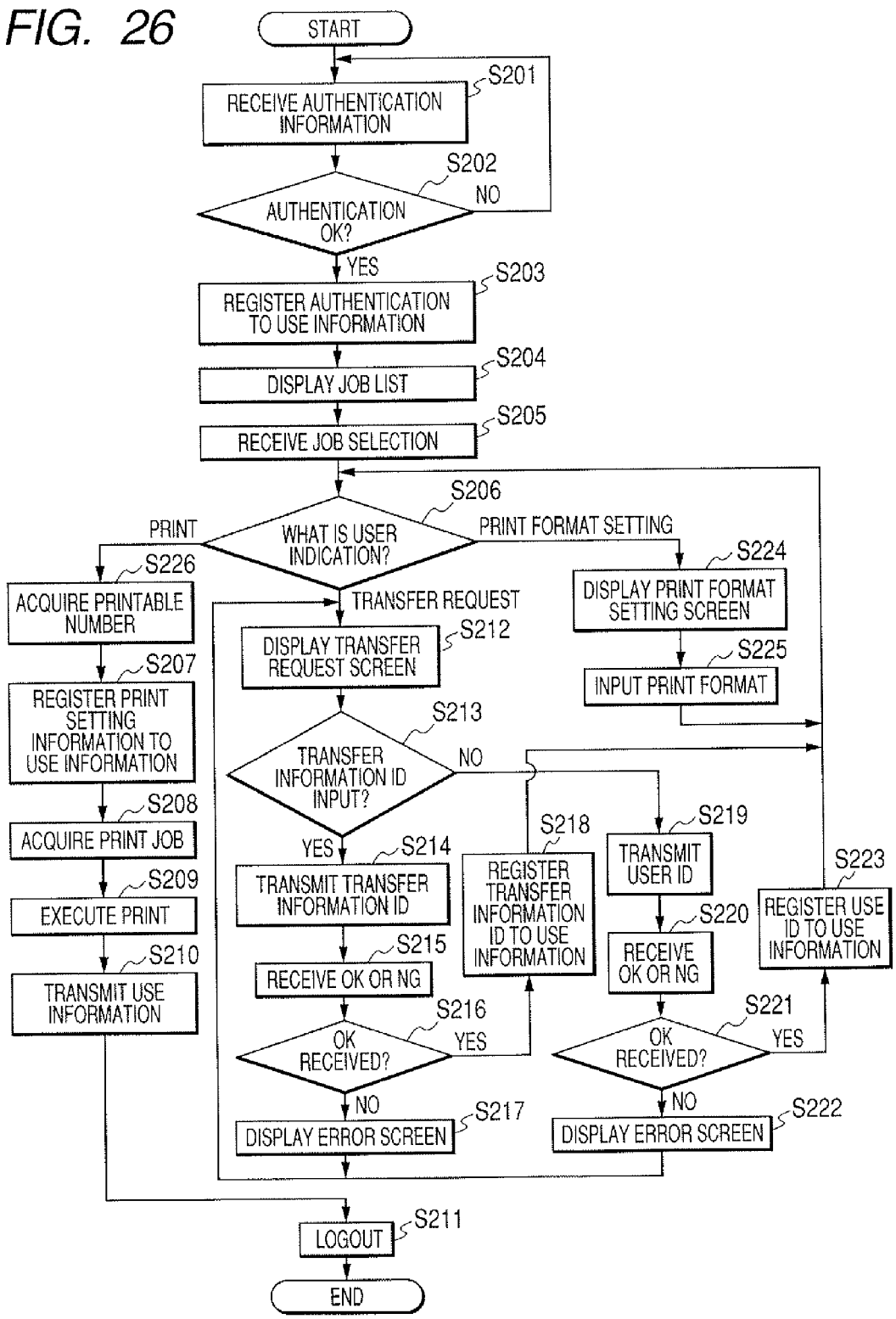
FIG. 26 is a flow chart showing the operation of the image forming device according to the embodiment.

FIG. 26 is a flow chart showing the operation of the image forming device 107 which acquires the print job registered in the pull print server 102 and then executes the printing based on the acquired print job.

Here, it should be noted that the processes in the respective steps of the flow chart shown in FIG. 26 are executed by the control unit 107b of the image forming device 107 which controls the respective function units.

Figure 15:
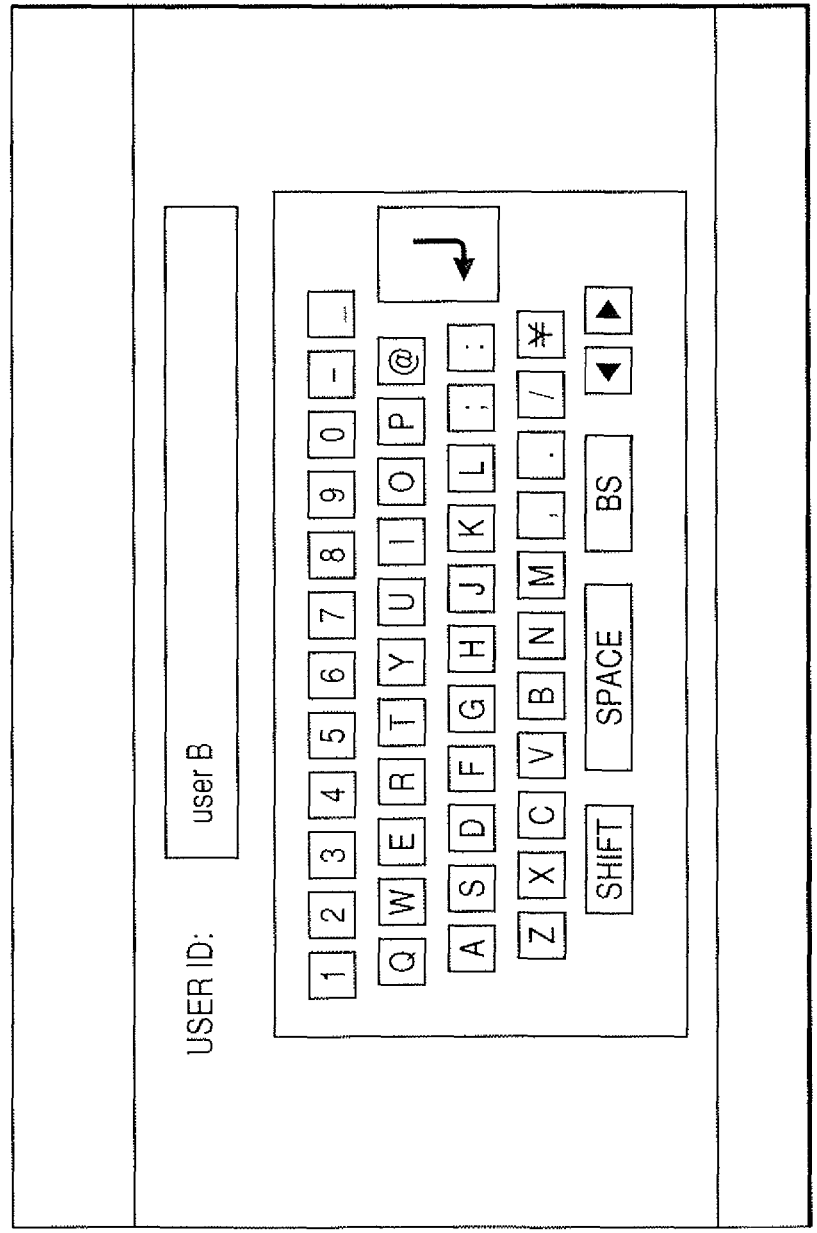
FIG. 15 is a diagram showing an example of the screen which is displayed on the image forming device according to the embodiment.

In a step S201, the operation unit 107b receives or accepts the authentication information of the user who indicates the printing. More specifically, the display screens shown in FIGS. 14 and 15 are displayed on the display unit 107c so as to receive the user ID and the password which are input by the user who indicates the printing. That is, FIG. 14 shows the display screen which is used by the user to input the user ID and the password for executing the authentication for the image forming device 107, and, in the present embodiment, the display unit 107c is constituted by a touch panel. More specifically, if a user ID input section 1401 or a password input section 1402 shown in FIG. 14 is depressed or clicked by the user, the soft keyboard screen shown in FIG. 15 is displayed on the display unit 107c. Thus, the user executes a predetermined input operation on the displayed keyboard. Incidentally, if the image forming device does not include any touch-panel display unit, it is of course possible to input the user ID and the password through the operation unit 107d.

Then, in a step S202, the control unit 107b discriminates the authentication information received in the step S201, and thus judges whether or not to receive or accept user's logging-in. Incidentally, it should be noted that the authentication information of the user who indicates the printing may be input by using the IC card reader 107g, the infrared reader 107h, the USB I/F 107i, the two-dimensional barcode I/F 107j, the biometrics authentication I/F 107k, or the like.

Subsequently, in a step S203, the control unit 107b writes the user ID discriminated in the step S202 to the use information 107m to be stored in the storage unit 107n.

FIG. 23 is a diagram showing an example of the data constitution of the use information 107m stored in the storage unit 107n.

In FIG. 23, the print number (i.e., the number of prints) when the user who indicates the printing uses the image forming device 107 is written in each of areas 2301 and 2302. More specifically, the print number for black-and-white printing is written in the area 2301, and the print number for color printing is written in the area 2302. Further, the ID of the user who actually indicates the printing by using the image forming device 107 is written in an area 2303. That is, the user ID discriminated in the step S201 is written in the area 2303. When the user who indicates the printing inputs the transfer information ID, the relevant transfer information ID is written in an area 2304. Further, the user ID of the user to whom the user who indicates the printing requests the transfer of the use amount is written in an area 2305. That is, the user ID of the user designated as the transfer source user is written in the area 2305. Furthermore, the name of the print job to be executed is written in an area 2306, and the ID of the print job is written in an area 2307. Moreover, the information of the print job such as the print number (the number of prints), the color/black-and-white, and the like is written in an area 2308. Moreover, the information of the print format setting such as the color/black-and-white, the double-sided/single-sided, and the like is written in an area 2309, and the date and time when the printing is executed by using the image forming device 107 is written in an area 2310.

If the user who indicates the printing logs in the image forming device 107, in a step S204, the network communication unit 107a receives the job list information from the pull print server 102 in accordance with the pull print indication sent by the user through the operation unit 107d. Then, the display unit 107c displays the print job list screen in an area 1605 shown in FIG. 16.

Incidentally, on the job list screen shown in FIG. 16, the jobs which can be printed by the user who indicates the printing are listed and displayed based on the job ID's input in the step S201 and the register ID's shown in FIG. 4.

Then, in a step S205, the operation unit 107d receives or accepts the user's input for designating the print job on the screen shown in FIG. 16.

In the step S206, it is judged by the control unit 107b what the content indicated by the user on the screen shown in FIG. 16 is. More specifically, when a transfer request button 1601 is depressed or clicked, it is judged that transfer of the use amount of the image forming device is requested by the user who indicates the printing. Further, when a print format change button 1602 is depressed or clicked, it is judged that the indication for changing the print format of the print job is issued. Furthermore, when a print button 1603 is depressed or clicked, it is judged that the printing of the print job selected from the job list of the area 1605 shown in FIG. 16. Moreover, when a logout button 1604 is depressed of clicked, it is judged that a logout process is indicated.

When it is judged in a step S206 that the print format change button 1602 is depressed or clicked, the flow advances to a step S224.

Figure 17:
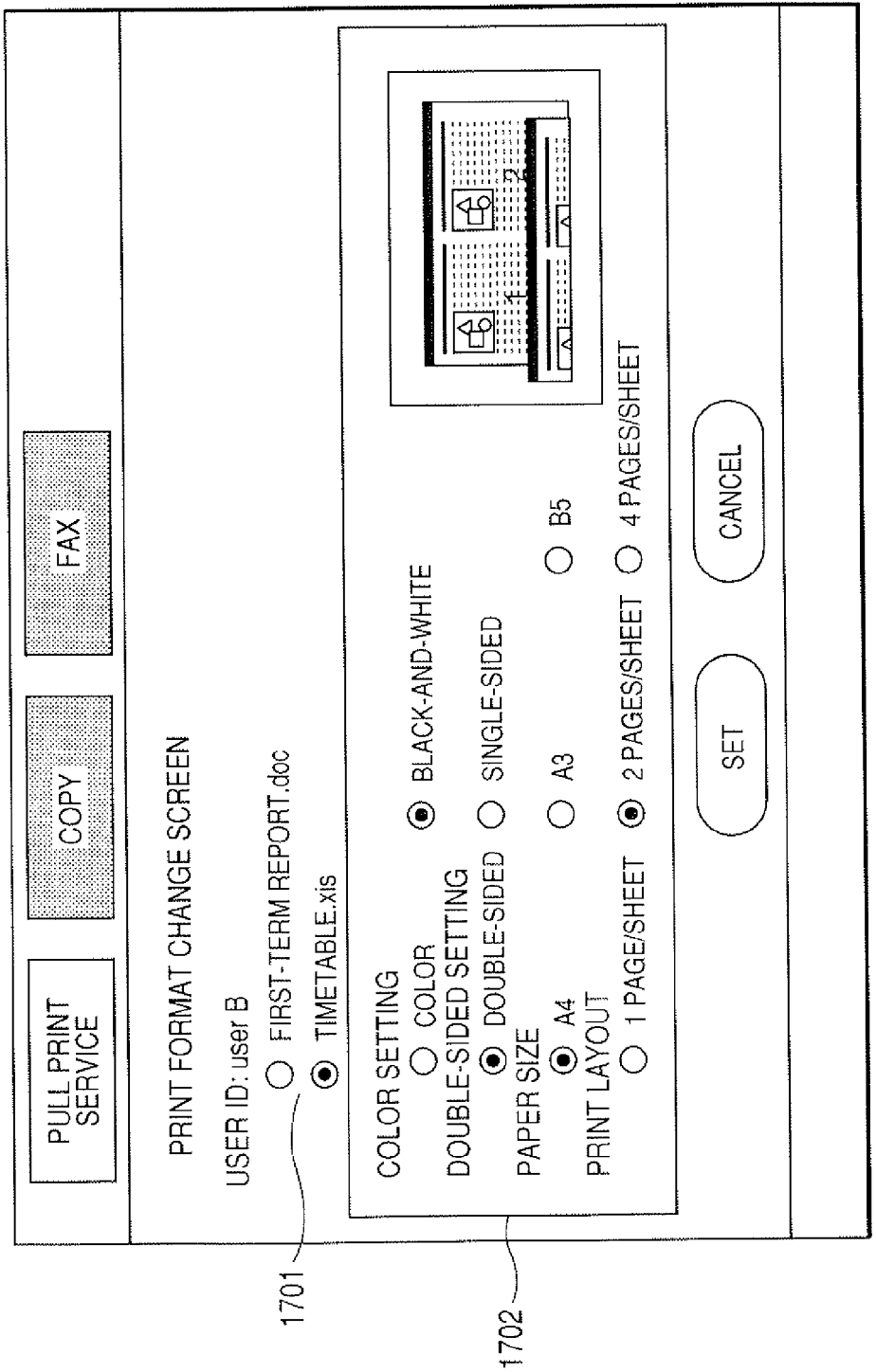
FIG. 17 is a diagram showing an example of the screen which is displayed on the image forming device according to the embodiment.

Then, in the step S224, the display unit 107c displays the screen shown in FIG. 17.

That is, FIG. 17 shows the screen to be used to input the indication for changing the print format information previously set in the print job.

When a checkbox 1701 is selected by the user who indicates the printing, the print job which is the target to which the print format is set is selected. Moreover, the print format can be set with respect to each print job by selecting each print format displayed in a section 1702.

Then, in a step S225, the operation unit 107d receives or accepts the print format setting information which is input through the screen shown in FIG. 17.

Incidentally, when it is judged in the step S206 that the transfer request button 1601 is depressed or clicked, the flow advances to a step S212.

In the step S212, the display unit 107c displays the screen shown in FIG. 18.

FIG. 18 shows the screen which is used to request the transfer of the use amount of the image forming device 107. In FIG. 18, the user who indicates the printing can indicate to request the transfer of the use amount by inputting the transfer information ID. Alternatively, the relevant user can indicate to acquire permission of the transfer of the use amount by inputting the user ID of the use who requests the transfer of the use amount.

Therefore, the user who indicates the printing inputs the transfer information ID or the user ID on the screen shown in FIG. 18.

In a step S213, the control unit 107b judges whether the transfer information ID is input in a box 1801 or the user ID is input in a box 1802. Further, when the user ID is input, an acknowledgment waiting period can be input in a box 1803. Here, it should be noted that the acknowledgment waiting period is the period for waiting until the user of which the user ID was input in the box 1802 decides whether or not to permit the transfer of the use amount. More specifically, the user can input a desired period in the box 1803. Incidentally, in a case where the acknowledgment waiting period is not input in the box 1803 although the user ID is input in the box 1802, a default period (for example, one day) previously set in the output management server 104 is used.

When it is judged in the step S213 that the transfer information ID is input, the flow advances to a step S214. On the other hand, when it is judged that the user ID is input, the flow advances to a step S219.

In the step S214, the control unit 107b transmits the input transfer information ID, the user ID of the user who indicates the printing, and the information of the print job, to the output management server 104 through the network communication unit 107a.

Then, in a step S215, the network communication unit 107a receives, from the output management server 104, the information representing that the transfer of the use amount is "OK" or "NG. Here, it should be noted that, if the transfer of the use amount is "OK", it implies that the transfer information ID input in the step S214 is judged to be valid in the output management server 104. On the other hand, it should be noted that, if the transfer of the use amount is "NG", it implies that the transfer information ID is not judged to be valid in the output management server 104. In any case, such judgment in the output management server 104 will be described later with referent to FIG. 27.

Subsequently, in a step S216, it is judged by the control unit 107b whether the information received in the step S215 is "OK" or "NG".

If it is judged in the step S216 that the information received in the step S215 is "OK", the flow advances to a step S218. In the step S218, the control unit 107b writes the transfer information ID in the area 2304 of the use information shown in FIG. 23, and then the flow returns to the step S206.

Meanwhile, if it is judged in the step S216 that the information received in the step S215 is "NG", the flow advances to a step S217 to execute an error display which notifies the user that the transfer of the use amount is not executed. Then, the flow returns to the step S212. FIG. 20 shows an example of the error screen to be displayed on the display unit 107c at that time. By using the displayed error screen, the user who indicates the printing can know the content of the error.

On the other hand, in the step S219, the control unit 107b transmits the input user ID, the user ID of the user who indicates the printing, and the information of the print job, to the output management server 104 through the network communication unit 107a.

Then, in a step S220, the network communication unit 107a receives, from the output management server 104, the information representing that the transfer of the use amount is "OK" or "NG. Here, it should be noted that it is judged based on the judgment in the output management server 104 whether the transfer of the use amount is "OK" or "NG". In any case, such judgment in the output management server 104 will be described later with referent to FIG. 27.

Subsequently, in a step S221, it is judged by the control unit 107b whether the information received in the step S220 is "OK" or "NG".

If it is judged in the step S221 that the information received in the step S221 is "OK", the flow advances to a step S223. In the step S223, the control unit 107b writes the user ID in the area 2305 of the use information shown in FIG. 23, and then the flow returns to the step S206.

Meanwhile, if it is judged in the step S221 that the information received in the step S221 is "NG", the flow advances to a step S222 to execute the error display which notifies the user that the transfer of the use amount is not executed. Then, the flow returns to the step S212.

Incidentally, when it is judged in the step S206 that the print button 1607 is depressed or clicked, the flow advances to a step S226.

In the step S226, the control unit 107b acquires the printable number (that is, the number of sheets capable of being printed) from the output management server 104. Here, in case of acquiring the printable number, the control unit 107b transmits the ID's respectively written in the areas 2303, 2304 and 2305 of the use information, if any, to the output management server 104. On the other hand, when only the user ID (that is, the ID written in the area 2303) of the user who indicates the printing is received, the output management server 104 searches the print number information corresponding to the received user ID, and transmits the remaining printable number in this month written in the area 508 or 509 to the image forming device 107. Further, when only the transfer information ID (that is, the ID written in the area 2304) is received, the output management server 104 searches the transfer information corresponding to the received transfer information ID, and transmits the transfer number written in the area 1204 or 1205 to the image forming device 107. Furthermore, when the user ID (that is, the ID written in the area 2303) of the user who indicates the printing and the user ID (that is, the ID written in the area 2305) of the user designated as the transfer source user are received, the output management server 104 searches the print number information corresponding to each of the received user ID's. Then, the output management server 104 transmits the smaller printable number in this month to the image forming device 107, so that the user for which the use amount of the image forming device is counted may be the user who indicates the printing or the user designated as the transfer source user.

In a step S207, the control unit 107b writes the information concerning the print job, the information concerning the print format setting, and the print date and time respectively to the areas 2308, 2309 and 2310 of the user information shown in FIG. 23.

Then, in a step S208, the control unit 107b acquires the print job from the pull print server 102 through the network communication unit 107a.

In a step S209, the image forming unit 107e executes the printing for the print job acquired in the step S208. At that time, it should be noted that the image forming unit 107e executes the printing within the range of the printable number acquired in the step S226. That is, when the print number exceeds the printable number, the image forming unit 107e stops the printing, and executes the error display on the display unit 107c to notify the user of such a fact.

In a step S210, the control unit 107b transmits the use information 107m stored in the storage unit 107n to the output management server 104 through the network communication unit 107a.

After then, in a step S211, according as the user who indicates the printing indicates to log out, the control unit 107b executes a logout process to end the processes in the flow chart shown in FIG. 26.

Figure 27:
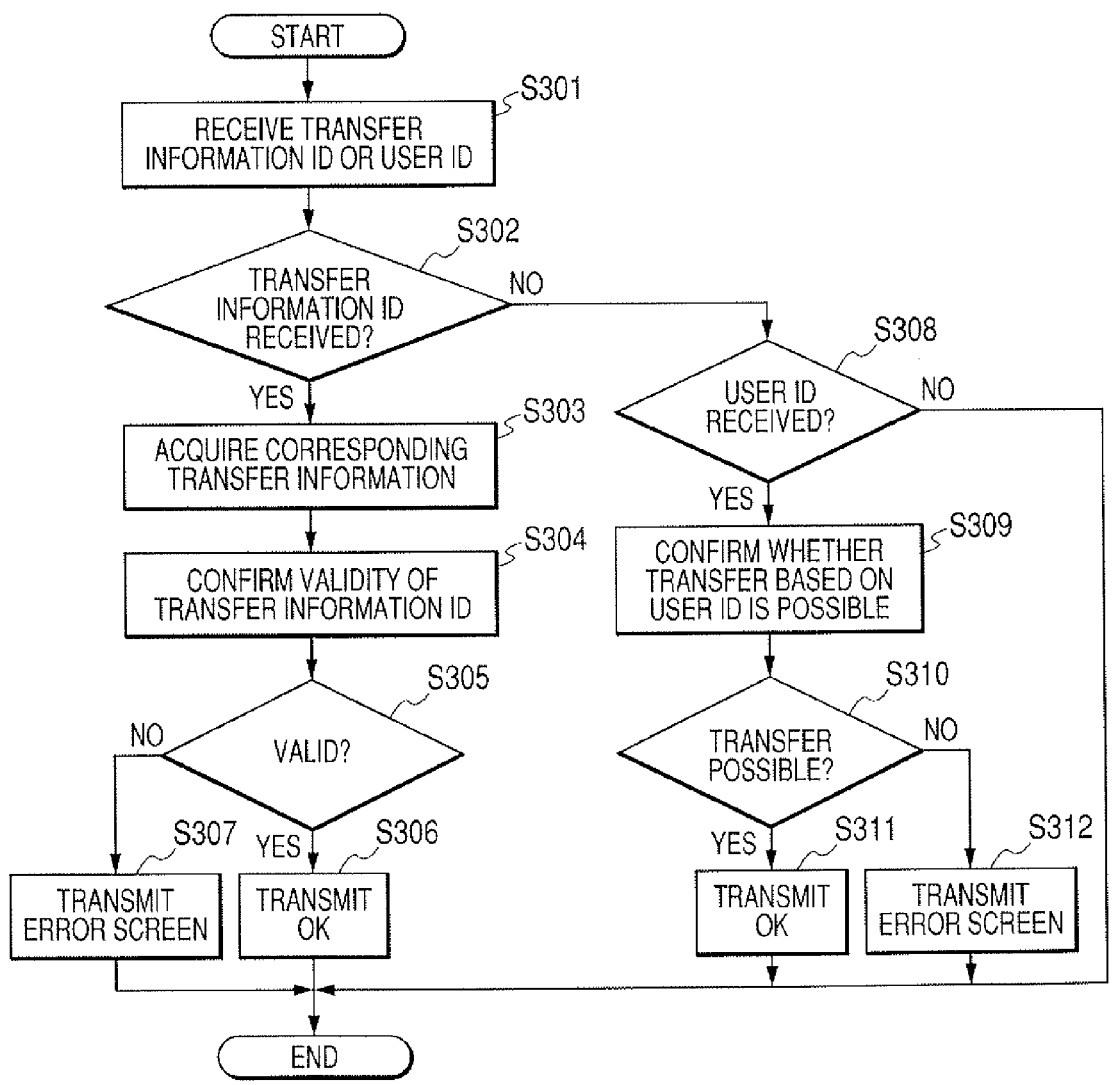
FIG. 27 is a flow chart showing the operation of the output management server according to the embodiment.

FIG. 27 is the flow chart showing the operation to be executed in the output management server 104 for receiving, from the image forming device 107, the transfer information ID or the user ID of the user designated as the transfer source user transmitted in the step S214 or S219 shown in FIG. 26.

Here, it should be noted that the processes in the respective steps of the flow chart shown in FIG. 27 are executed by the control unit 104b which controls the respective function units.

First, in a step S301, the network communication unit 104a receives the user ID of the user who indicates the printing, the information representing the print job, and the transfer information ID or the user ID of the user designated as the transfer source user, transmitted from the image forming device 107.

Then, in a step S302, it is judged by the control unit 104b whether or not the transfer information ID is included in the information received in the step S301. If it is judged by the control unit 104b that the transfer information ID is included in the information received in the step S301, the flow advances to a step S303. On the other hand, if it is judged by the control unit 104b that the transfer information ID is not included in the received information, the flow advances to a step S308.

In the step S303, the transfer information management unit 104h searches and acquires the transfer information 104j corresponding to the received transfer information ID from the transfer information storage unit 104i. FIG. 12 shows an example of the transfer information stored in the transfer information storage unit 104i.

Then, in a step S304, the transfer information management unit 104h compares the transfer information acquired in the step S303 and the information of the print job received in the step S301 with each other to judge whether or not the transfer information ID received in the step S301 is valid.

Here, it should be noted that the judgment in the step S304 is executed based on the confirmation items shown in FIG. 19.

First, in a confirmation item 1-a, it is judged whether or not the transfer information corresponding to the received transfer information ID has been stored in the transfer storage unit. If the corresponding transfer information is searched in the step S303, it satisfies the condition of the confirmation item 1-a. In a confirmation item 2-a, the print job information and the area 1205 of the transfer information shown in FIG. 12 are compared with each other, and it is thus judged whether or not the print number of the print job is smaller than the transfer number for color printing in the area 1205. In a confirmation item 3-a, the print job information and the area 1204 of the transfer information shown in FIG. 12 are compared with each other, and it is thus judged whether or not the print number of the print job is smaller than the transfer number for black-and-white printing in the area 1204. In a confirmation item 4-a, it is judged whether or not the remaining printable number of the transfer source user is larger than the transfer number in the area 1204 and the transfer number in the area 1205 both shown in FIG. 12. In a confirmation item 5-a, it is judged whether or not the user ID of the user who indicates the printing conforms to the user ID (that is, the user ID of the transfer destination user) of the area 1203 of the transfer information shown in FIG. 12. In a confirmation item 6-a, it is judged whether or not the number of times of use of the transfer information exceeds the number of times in the area 1206 of the transfer information shown in FIG. 12. In a confirmation item 7-a, it is judged whether or not the current date and time is within the validity term written in the area 1207 of the transfer information shown in FIG. 12. In a confirmation item 8-a, it is judged whether or not the job ID of the print job conforms to the job ID written in the area 1208 of the transfer information shown in FIG. 12. In a confirmation item 9-a, it is judged whether or not the print format of the print job conforms to the print formats respectively written in the areas 1209 to 1212 of the transfer information shown in FIG. 12. Here, it should be noted that the confirmation items are not limited to those shown in FIG. 19. That is, it is possible to apply other confirmation items. Alternatively, it is possible to apply only a part or parts of the confirmation items shown in FIG. 19.

After the confirmation executed in the step S304, it is judged by the control unit 104h in a step S305 whether or not the necessary conditions are all satisfied in the above confirmation items 1-*a* to 9-*a* shown in FIG. 19. Then, if it is judged that the conditions are satisfied in the above confirmation items 1-*a* to 9-*a* and it is thus judged that the transfer information ID is valid, the flow advances to a step S306. On the other hand, if it is judged in the step S305 that even one condition is not satisfied in the confirmation items, the flow advances to a step S307.

In the step S306, the control unit 104*b* notifies through the network communication unit 104*a* the image forming device 107 that the transfer of the use amount based on the transfer information ID is "OK".

In the step S307, the control unit 104*b* creates the error screen for displaying that the transfer of the use amount based on the transfer information ID is "NG", and transmits the created screen to the image forming device 107 through the network communication unit 104*a*. FIG. 20 shows the example of the error screen to be displayed on the display unit 107*c* at that time. More specifically, FIG. 20 shows the error screen which displays that the condition in the confirmation item 7-*a* from among the confirmation items shown in FIG. 19 is not satisfied. Here, it should be noted that items 1-*b* to 10-*b* shown in FIG. 21 respectively show examples of the error messages.

Subsequently, in the step S308, it is judged by the control unit 104*b* whether or not the user ID of the user designated as the transfer source user is included in the information received in the step S301. Then, if it is judged by the control unit 104*b* that the user ID of the user designated as the transfer source user is included in the received information, the flow advances to a step S309. On the other hand, if it is judged by the control unit 104*b* that the user ID of the user designated as the transfer source user is not included in the received information, it is judged that some kind or another transmission error occurs, and the process ends.

Subsequently, in the step S309, on the basis of the content of a confirmation item 10-*a* shown in FIG. 19, it is judged by the print number information management unit 104*d* whether or not the print number information corresponding to the user ID of the user designated as the transfer source user has been stored in the print number information storage unit 104*e*. In other words, it is judged whether or not the user designated as the transfer source user has been registered as the user who can use the image forming device 107 in the output management server 104. More specifically, it is judged whether or not the print number information of the user designates as the transfer source user is managed by the print number information management unit 104*d*.

On the basis of the result judged in the step S309, it is further judged by the control unit 104*b* in a step S310 whether or not the transfer of the use amount can be executed. If it is judged that the transfer of the use amount can be executed, the flow advances to a step S311. On the other hand, if it is judged that the transfer of the use amount cannot be executed, the flow advances to a step S312.

Then, in the step S311, the control unit 104*b* notifies through the network communication unit 104*a* the image forming device 107 that the transfer of the use amount based on the user ID is "OK".

In the step S312, the control unit 104*b* creates the error screen for displaying that the transfer of the use amount based on the user ID is "NG", and transmits the created screen to the image forming device 107 through the network communication unit 104*a*.

Figure 28:
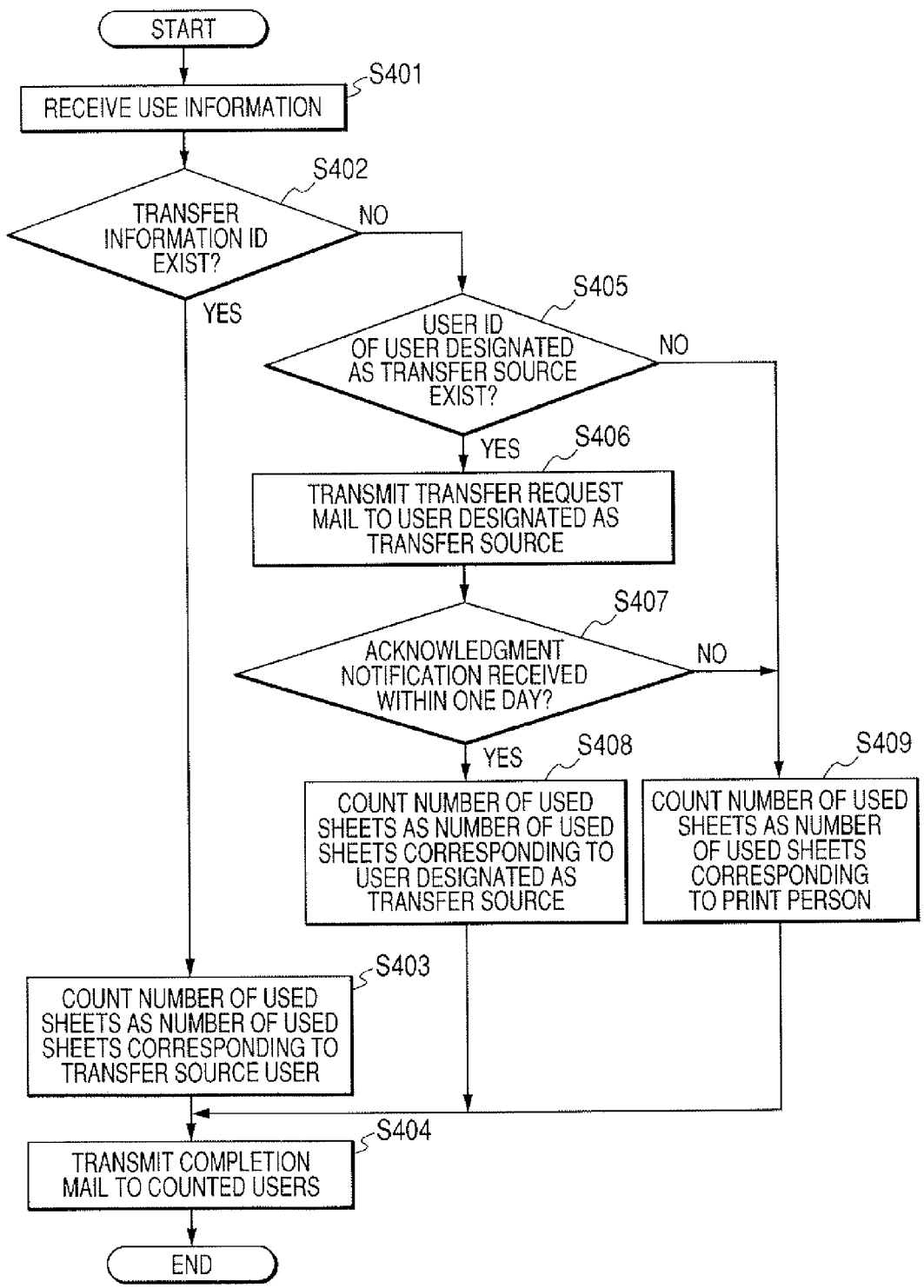
FIG. 28 is a flow chart showing the operation of the output management server according to the embodiment.

FIG. 28 is a flow chart showing the operation of the output management server 104 which received the user information transmitted from the image forming device 107 in the step S210 shown in FIG. 26.

Here, it should be noted that the processes in the respective steps of the flow chart shown in FIG. 28 are executed by the control unit 104*b* which controls the respective function units.

First, in a step S401, the network communication unit 104*a* receives the use information transmitted from the image forming device 107. FIG. 23 shows the example of the use information received in the step S401.

Then, in a step S402, it is judged by the control unit 104*b* whether or not the transfer information ID has been written in the area 2304 of the use information received in the step S401. If it is judged by the control unit 104*b* that the transfer information ID has been written in the area 2304, the flow advances to a step S403. On the other hand, if it is judged by the control unit 104*b* that the transfer information ID is not written in the area 2304, the flow advances to a step S405.

In the step S403, the transfer information management unit 104*h* searches and acquires the transfer information corresponding to the transfer information ID written in the area 2304 of the user information from the transfer information storage unit 104*i*. Then, the control unit 104*b* reads the user ID in the area 1202 of the transfer information acquired by the transfer information management unit 104*h*. The print number information management unit 104*d* searches and acquires the print number information of the user corresponding to the user ID read by the control unit 104*b*, from the print number information storage unit 104*e*. After then, the control unit 104*b* adds the number of sheets in the area 2301 or 2302 of the use information to the area 506 or 507 of the acquired print number information. As a result, the number of used sheets at the time when the user who designates or indicates the printing actually uses the image forming device is counted as the number of used sheets corresponding to the transfer source user.

In the step S405, it is judged by the control unit 104 whether or not the user ID of the user designated as the transfer source user has been written in the area 2305 of the use information received in the step S401. Then, if it is judged in the step S405 that the user ID of the user designated as the transfer source user has been written in the area 2305, the flow advances to a step S406. On the other hand, if it is judged in the step S405 that the user ID of the user designated as the transfer source user is not written in the area 2305, the flow advances to a step S409.

Subsequently, in the step S406, the mail creation unit 104*k* creates the mail for requesting the transfer of the use amount of the image forming device to the user designated as the transfer source user, based on the user ID written in the area 2305 of the use information. Here, it should be noted that the relevant mail is created to acquire permission of the transfer of the use amount from the user designated as the transfer source user. FIG. 22 shows an example of the mail created in the step S406. Incidentally, it should be noted that a destination of the created mail is set based on the mail address written in the area 503 of the print number information, and the control unit 104*b* transmits the mail created by the mail creation unit 104*k* to the predetermined mail address through the network communication unit 104*a*.

Further, it should be noted that the user who received the mail shown in FIG. 22 can designate whether to permit or refuse the transfer request of the content described in the received mail. Here, if the relevant user permits the transfer request, the information representing such permission is transmitted to the output management server 104 by designating a URL (Uniform Resource Locater) 2201 shown in FIG. 22. On the other hand, if the relevant user refuses the transfer request, the information representing such refusal is transmitted to the output management server 104 by designating a URL 2202 shown in FIG. 22.

Furthermore, in the step S406, the print number information management unit 104*d* provisionally holds the necessary information. More specifically, the control unit 104*b* reads the user ID from the area 2305 of the use information. Then, the print number information management unit 104*d* searches and acquires the print number information of the user (that is, the user designated as the transfer source user) corresponding to the user ID read by the control unit 104*b*, from the print number information storage unit 104*e*. After then, the control unit 104*b* adds the number of sheets in the area 2301 or 2302 of the use information to the area 506 or 507 of the acquired print number information. In addition, the control unit 104*b* reads the user ID from the area 2303 of the use information. Then, the print number information management unit 104*d* searches and acquires the print number information of the user (that is, the user who designates or indicates the printing) corresponding to the user ID read by the control unit 104*b*, from the print number information storage unit 104*e*. After then, the control unit 104*b* adds the number of sheets in the area 2301 or 2302 of the use information to the area 506 or 507 of the acquired print number information.

Subsequently, in a step S407, it is judged by the control unit 104*b* whether or not the information which notifies that the transfer request is permitted is received within a predetermined period (for example, one day) elapsing from the transmission of the mail in the step S406. Then, if it is judged in the step S407 that the information which notifies that the transfer request is permitted is received within the predetermined period, the flow advances to a step S408. On the other hand, if it is judged in the step S407 that the information which notifies that the transfer request is permitted is not received within the predetermined period, or if the information which notifies that the transfer request is refused is received, the flow advances to the step S409. Here, it should be noted that the flow chart shown in FIG. 29 shows an example in which the default term (one day) previously set in the output management server 104 is used as the predetermined period. As above, if it is judged whether or not the information for notifying the permission is received within the predetermined period, it is unnecessary to idly wait for a response to the mail transmitted by the output management server 104 in the step S406. However, the user who uses the image forming device 107 may determine the relevant period. For example, on the screen shown in FIG. 17, a section to which "acknowledgment waiting period" can be input may be provided in the section to which the user ID of the use who requests the transfer of the use amount is input, so that the user can input a desired period such as "one day", "one week" or the like. In that case, it is judged in the step S407 whether or not the information for notifying the permission of the transfer request is received within the predetermined period input by the user. In any case, if it is possible for the user to freely designate the acknowledgement waiting period, it is possible to input a sufficient period during which the user designated as the transfer source user can surely respond to the mail. That is, if the user designated as the transfer source user is the user who hardly uses the mail, it only has to designate a relatively long period. On the other hand, if the user designated as the transfer source user is the user who frequently uses the mail, it only has to designate a short period.

Then, in the step S408, the control unit 104*b* reads the user ID in the area 2303 of the use information, and the print number information management unit 104*d* searches and acquires the print number information of the user (that is, the user who designates or indicates the printing) corresponding to the user ID read by the control unit 104*b*, from the print number information storage unit 104*e*. After then, the control unit 104*b* subtracts the number of sheets in the area 2301 or 2302 of the use information from the area 506 or 507 of the acquired print number information. As a result, the number of used sheets at the time when the user who designates or indicates the printing actually uses the image forming device is counted as the number of used sheets corresponding to the user (that is, the user corresponding to the user ID input in the box 1802 shown in FIG. 18) designated as the transfer source user.

Subsequently, in the step S409, the control unit 104*b* reads the user ID in the area 2305 of the use information, and the print number information management unit 104*d* searches and acquires the print number information of the user (that is, the user designated as the transfer source user) corresponding to the user ID read by the control unit 104*b*, from the print number information storage unit 104*e*. After then, the control unit 104*b* subtracts the number of sheets in the area 2301 or 2302 of the use information from the area 506 or 507 of the acquired print number information. As a result, the number of used sheets at the time when the user who designates or indicates the printing actually uses the image forming device is counted as the number of used sheets corresponding to the user who designates or indicates the printing.

Then, in a step S404, the mail which notifies that the print number information was added is transmitted to the user who added the print number information. Here, FIG. 24 shows an example of the mail to be transmitted to the user who added the print number information. Incidentally, it should be noted that, as the destination of the mail to be transmitted, the mail address written in the area 503 of the print number information is designated.

Thus, the operation of the output management server 104 which received the use information transmitted from the image forming device 107 ends.

As explained above, according to the present embodiment, it is possible for the user who indicates the printing using the image forming device to designate another user, acquire the permission of the relevant another user, and then count as the use amount corresponding to the relevant another user the use amount at the time when the user who indicates the printing uses the image forming device. That is, when a certain user (that is, transfer destination user) wishes another user (transfer source user) to transfer the use amount of the image forming device, it is unnecessary for the transfer source user to previously make preparation for the transfer, whereby it is also unnecessary for the transfer destination user to wait for the previous preparation.

Moreover, if the transfer information is previously generated (or issued), it is possible, by inputting the transfer information ID of the generated transfer information, to count the use amount at the time when the user who indicates the printing uses the image forming device, as the use amount corresponding to another user based on the transfer information. That is, according to the present embodiment, it is possible by several methods to acquire the use amount of the image forming device transferred from another user, irrespective of whether or not the relevant another user (transfer source user) previously makes preparation.

Other Embodiments

In the above embodiment, the system which can achieve the so-called pull print function is explained as the example of the information processing system which achieves the present invention. However, it should be noted that the present invention is not limited to the system explained in the above embodiment. For example, the present invention is also applicable to a system which does not contain the pull print server 102. Further, in the above embodiment, the output management server which manages the print number using the image forming device 107 is explained. However, the present invention is not limited to the output management server which manages the use amount of the image forming device. For example, the present invention is also applicable to an information processing device which manages the data processes (for example, the number of copies, the number of times of facsimile transmission, a print process for the print data transmitted from a client PC, the number of times of mail transmission, and the fees necessary for these processes) of a data processing device.

Furthermore, in the above embodiment, the example that each of the pull print server 102, the output management server 102 and the image forming device 107 is independently provided is explained. However, the present invention is not limited to this. That is, the present invention can be achieved even if an information processing device in which the respective functions of the pull print server 102, the output management server 102 and the image forming device 107 are built in one device is used.

For example, the present invention may be provided as the image forming device which includes the function of the output management server in the above embodiment as a controller.

Moreover, the present invention may be provided as a system which consists of the server for executing the function of the count means of the present invention and the image forming device for executing the functions of other means.

Incidentally, it is needless to say that the present invention can be achieved in a case where a medium such as a storage medium of storing therein the program codes of software for achieving the functions of the above embodiments is supplied to a system or a device and thus the computer (or CPU or MPU) in the system or the device reads the program codes stored in the medium and executes based on the read program codes the respective steps in the flow charts of the above embodiments.

In that case, the program codes themselves read out of the medium such as the storage medium achieve the functions of the above embodiments. Therefore, the medium such as the storage medium of storing these program codes constitutes the present invention. Here, as the medium such as the storage medium from which the program codes are supplied, for example, a Floppy™ disk, a hard disk, an optical disk, a magnetooptical disk, a CD-ROM, a CD-R, a magnetic tape, a nonvolatile memory card, a ROM, downloading through a network, or the like can be used.

Further, it is needless to say that the present invention also includes a case where an OS or the like running on the computer executes a part or all of the actual processes based on the indications of the program codes read by the computer and thus the functions of the above embodiments are achieved by these processes.

Furthermore, it is needless to say that the present invention also includes a case where, after the program codes read out of the medium such as the storage medium are written into the memory provided in the function expansion board inserted in the computer or the memory provided in the function expansion unit connected to the computer, the CPU or the like provided in the function expansion board or the function expansion unit executes a part or all of the actual processes based on the indications of these program codes, and thus the functions of the above embodiments are achieved by these processes.

As many apparently widely different embodiments of the present invention can be made without departing from the spirit and scope thereof, it is to be understood that the present invention is not limited to the specific embodiments thereof expect as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-230841 filed Aug. 9, 2005, which is hereby incorporated by reference herein in its entirety.

What is claimed is:

1. An information processing device which counts amount of print for users who use a printing device which executes a printing process, said information processing device comprising:
   a communication unit receiving first discrimination information of a first user to inquire the first user of permission to count amount of print in printing process instructed by a second user as the amount of print corresponding to the first user, receiving second discrimination information of the second user who instructs the printing process, sending, after the printing process instructed by the second user is executed, inquiry of the permission to count amount of print in the printing process as the amount of print corresponding to the first user to mail address corresponding to the first user specified by the first discrimination information, and receiving the permission; and
   a control unit judging whether or not the permission is received by said communication unit, counting, in a case where it is judged that the permission is received by said communication unit, amount of print in the printing process instructed by the second user, as the amount of print corresponding to the first user based on the first discrimination information, and counting, in a case where it is judged that the permission is not received by said communication unit, amount of print in the printing process instructed by the second user, as the amount of print corresponding to the second user based on the second discrimination information.

2. An information processing device according to claim 1, further comprising a storage unit storing transfer information for transferring the amount of print from the first user to the second user, wherein
   said communication unit receives third discrimination information of the transfer information, and
   said control unit counts, if the third discrimination information is received by said communication unit, amount of print in the printing process instructed by the second user, as the amount of prints corresponding to the first user based on the transfer information stored by said storage unit.

3. An information processing device according to claim 1, wherein the amount of print is the number of prints or print fees.

4. A printing device which executes a printing process and counts amount of print for users who use the printing device, comprising:
   a first discrimination information inputting unit inputting first discrimination information of a first user to inquire the first user of permission to count amount of print in printing process instructed by a second user as the amount of print corresponding to the first user;

a second discrimination information inputting unit inputting second discrimination information of the second user who instructs the printing process;

a communication unit sending, after the printing process instructed by the second user is executed, inquiry of permission to count amount of print in the printing process as the amount of print corresponding to the first user to mail address corresponding to the first user specified by the first discrimination information, and receiving the permission; and a control unit judging whether or not the permission is received by said communication unit, counting, in a case where it is judged that the permission is received, amount of print in the printing process instructed by the second user, as the amount of print corresponding to the first user based on the first discrimination information and counting, in a case where it is judged that the permission is not received, amount of print in the printing process instructed by the second user, as the amount of print corresponding to the second user based on the second discrimination information.

5. A printing device according to claim 4, wherein the amount of print is the number of prints or print fees.

6. A count method which is performed by an information processing device which counts amount of print for users who use a printing device which executes a printing process, said method comprising:

receiving first discrimination information of a first user to inquire the first user of permission to count amount of print in printing process instructed by a second user as the amount of print corresponding to the first user;

receiving second discrimination information of the second user who instructs the printing process;

sending, after the printing process instructed by the second user is executed, inquiry of permission to count amount of print in the printing process as the amount of print corresponding to the first user to mail address corresponding to the first user specified by the first discrimination information;

judging whether or not the permission is received;

counting, in a case where it is judged that the permission is received, amount of print in the printing process instructed by the second user, as the amount of print corresponding to the first user based on the first discrimination information; and counting, in a case where it is judged that the permission is not received, amount of print in the printing process instructed by the second user, as the amount of prints corresponding to the second user based on the second discrimination information.

7. A non-transitory recording medium which stores therein a computer program for a computer which counts amount of print for users who use a printing device which executes a printing process, said computer program causing the computer to execute:

controlling a communication unit to send, after a printing process instructed by a second user is executed, inquiry of permission to count amount of print in the printing process as the amount of print corresponding to a first user to mail address corresponding to the first user specified by first discrimination information of the first user;

judging whether or not the permission is received by the communication unit;

counting, in a case where it is judged that the permission is received, amount of print in the printing process instructed by the second user, as the amount of print corresponding to the first user based on the first discrimination information; and counting, in a case where it is judged that the permission is not received, amount of print in the printing process instructed by the second user, as the amount of print corresponding to the second user based on second discrimination information of the second user.

8. A count method according to claim 6, further comprising:

storing transfer information for transferring the amount of print from the first user to the second user;

receiving third discrimination information of the transfer information; and counting, if the third discrimination information is received, amount of print in the printing process instructed by the second user, as the amount of prints corresponding to the first user based on the stored transfer information.

9. A count method according to claim 6, wherein the amount of print is the number of prints or print fees.

10. A count method which is performed by a printing device which executes a printing process, said method comprising:

inputting first discrimination information of a first user to inquire the first user of permission to count amount of print in printing process instructed by a second user as the amount of print corresponding to the first user;

inputting second discrimination information of the second user who instructs the printing process;

sending, after the printing process instructed by the second user is executed, inquiry of permission to count amount of print in the printing process as the amount of print corresponding to the first user to mail address corresponding to the first user specified by the first discrimination information;

judging whether or not the permission is received;

counting, in a case where it is judged that the permission is received, amount of print in the printing process instructed by the second user, as the amount of print corresponding to the first user based on the first discrimination information; and counting, in a case where it is judged that the permission is not received, amount of print in the printing process instructed by the second user, as the amount of print corresponding to the second user based on the second discrimination information.

* * * * *